US012804438B2

(12) United States Patent

Bergström et al.

(10) Patent No.: US 12,804,438 B2
(45) Date of Patent: Nov. 17, 2026

(54) RELAXED MEASUREMENT MODE OF OPERATION WHEN UE PERFORMS HIGH-PRIORITY ACTIONS

(71) Applicant: Telefonaktiebolaget LM Ericsson (publ), Stockholm (SE)

(72) Inventors: Mattias Bergström, Sollentuna (SE); Santhan Thangarasa, Vällingby (SE); Muhammad Ali Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 284 days.

(21) Appl. No.: 18/291,447

(22) PCT Filed: Jun. 7, 2022

(86) PCT No.: PCT/SE2022/050553
§ 371 (c)(1),
(2) Date: Jan. 23, 2024

(87) PCT Pub. No.: WO2023/014253
PCT Pub. Date: Feb. 9, 2023

(65) Prior Publication Data

US 2024/0214849 A1 Jun. 27, 2024

Related U.S. Application Data

(60) Provisional application No. 63/229,740, filed on Aug. 5, 2021.

(51) Int. Cl.
*H04W 24/10* (2009.01)
*H04W 36/00* (2009.01)
*H04W 88/06* (2009.01)

(52) U.S. Cl.
CPC ....... *H04W 24/10* (2013.01); *H04W 36/0085* (2018.08); *H04W 88/06* (2013.01)

(58) Field of Classification Search
CPC ............. H04W 88/06; H04W 36/0085; H04W 24/10
See application file for complete search history.

(56) References Cited

U.S. PATENT DOCUMENTS

2021/0105649 A1* 4/2021 Lee ...................... H04W 24/10

FOREIGN PATENT DOCUMENTS

EP 1418784 A1 5/2004
WO 2020193616 A1 10/2020
WO 2021066447 A1 4/2021

OTHER PUBLICATIONS

"Revised WID on support of reduced capability NR devices", 3GPP TSG RAN Meeting #91e, RP-210918, Revision of RP-210894, Nokia, Ericsson, Electronic Meeting, Mar. 22-26, 2021, 6 pages.

(Continued)

*Primary Examiner* — James P Duffy
(74) *Attorney, Agent, or Firm* — Murphy, Bilak & Homiller, PLLC

(57) ABSTRACT

The disclosure provides, inter alia, a method performed by a user equipment which is capable of operating in a relaxed measurement mode of operation. The method comprises: responsive to a determination that the user equipment is to perform or is performing one or more high-priority actions, refraining from operating in the relaxed measurement mode of operation.

20 Claims, 8 Drawing Sheets

(56) References Cited

OTHER PUBLICATIONS

Ericsson , "Revised WID on support of reduced capability NR devices", 3GPP TSG RAN Meeting #92e, RP-211574, Revision of RP-210918, Electronic Meeting, Jun. 14-18, 2021, 1-6.

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304 V16.4.0, Jun. 2021, 64 pages.

"3rd Generation Partnership Project; Technical Specification Group Radio Access Network; NR; Radio Resource Control (RRC) protocol specification (Release 16)", 3GPP TS 38.331 V16.4.1, Mar. 2021, 949 pages.

"Coexistence of measurement relaxation and early measurements", 3GPP TSG-RAN WG2 Meeting #108, R2-1915819, LG Electronics Inc., MediaTek, Reno, USA, Nov. 18-22, 2019, 2 pages.

* cited by examiner

RELAXED MEASUREMENT MODE OF OPERATION WHEN UE PERFORMS HIGH-PRIORITY ACTIONS

TECHNICAL FIELD

Embodiments of the disclosure relate to wireless communications, and particularly to methods, apparatus and device-readable media relating to relaxed measurement modes of operation.

BACKGROUND

RedCap 5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) which makes use of a new air interface called New Radio (NR), and a new core network (5GC).

The initial release of 5G in Release 15 is optimized for mobile broadband (MBB) and ultra-reliable and low latency communication (URLLC). These services require very high data rates and/or low latency and therefore puts high requirements on the UE. To enable 5G to be used for other services with more relaxed performance requirements a new low complexity user equipment (UE) type is introduced in Release 17, called 'reduced capability NR devices' or RedCap. The low complexity UE type is particularly suited for machine type communication (MTC) services such as wireless sensors or video surveillance, but it can also be used for MBB services with lower performance requirements such as wearables. The low complexity UE has reduced capabilities compared to a Release 15 NR UE such as possibility to support lower bandwidth compared to what is currently required for a NR UE and possibility to support only one reception (Rx) branch and one multi-input-multi-output (MIMO) layer [for full detail refer to the Rel-17 work item description in RP-210918].

RRM Measurement Relaxation

When an NR device is in radio resource control (RRC) connected it may be configured to perform radio resource management (RRM) measurements. RRM measurements are for example measurements of signal strength at the UE and measurements are described in detail in the section entitled "UE measurements" below. The UE can be configured to report to the network the measurements of the UE.

The RRM measurements may consume UE power due to the need to perform measurement and also report those measurements. Hence it is being discussed in 3GPP to introduce relaxed RRM measurements in CONNECTED mode. The measurements would be relaxed in the sense that the requirements for the RRM measurements are not as stringent as they normally are, e.g. by decreasing the frequency on how often the UE needs to perform a measurement, decreasing the number of carriers and/or cells the UE is required to measure on compared to a reference case (e.g. release 15 UE requirements), measuring over a longer time period compared to the reference measurement period.

Relaxed RRM measurements may save some UE energy. However, they may at the same time reduce the accuracy of the measurements or some measurements may never be performed or sent to the network which may have an adverse impact on the UE mobility performance. Hence the relaxed RRM measurements shall only be performed when certain conditions are met.

It has been discussed that the UE shall monitor those certain conditions and report to the network whether they are fulfilled and not. One possible condition is that the UE-measured reference signal received power (RSRP) is above a certain threshold.

In response to such a report, the network may configure the UE to perform RRM relaxation. Two approaches are discussed:

- the network explicitly indicates that the UE shall apply a relaxed RRM measurement behaviour (the behaviour would likely be specified in a specification, e.g. that the frequency of the measurements is reduced)
- the network reconfigures the RRM measurement configuration for the UE. For example, the network may deconfigure measurements on some frequencies, or the periodicity of RRM measurement reporting is increased, etc.

UE Measurements

The UE performs measurements on one or more downlink (DL) and/or uplink (UL) reference signal (RS) of one or more cells in different UE activity states e.g. RRC idle state, RRC inactive state, RRC connected state etc. The measured cell may belong to or operate on the same carrier frequency as the serving cell (e.g. intra-frequency carrier) or it may belong to or operate on a different carrier frequency than the serving cell (e.g. non-serving carrier frequency). The non-serving carrier may be called inter-frequency carrier if the serving and measured cells belong to the same radio access technology (RAT) but different carriers. The non-serving carrier may be called inter-RAT carrier if the serving and measured cells belong to different RATs. Examples of downlink RS are signals in channel state information reference signals (CSI-RS), cell reference signals (CRS), demodulation reference signals (DMRS), primary synchronization signal (PSS), secondary synchronization signal (SSS), signals in synchronization signal (SS)/physical broadcast channel (PBCH) block (SSB), discovery reference signal (DRS), positioning reference signal (PRS) etc. Examples of uplink RS are signals in sounding reference signals (SRS), DMRS etc.

Each SSB carries NR-PSS, NR-SSS and NR-PBCH in four successive symbols. One or multiple SSBs are transmitted in one SSB burst which is repeated with certain periodicity e.g. 5 ms, 10 ms, 20 ms, 40 ms, 80 ms and 160 ms. The UE is configured with information about SSB on cells of certain carrier frequency by one or more SS/PBCH block measurement timing configuration (SMTC) configurations. The SMTC configuration comprises parameters such as SMTC periodicity, SMTC occasion length in time or duration, SMTC time offset with respect to reference time (e.g. serving cell's system frame number (SFN)) etc. Therefore, SMTC occasion may also occur with certain periodicity e.g. 5 ms, 10 ms, 20 ms, 40 ms, 80 ms and 160 ms.

Examples of measurements are cell identification (e.g. physical cell ID (PCI) acquisition, PSS/SSS detection, cell detection, cell search etc), Reference Symbol Received Power (RSRP), Reference Symbol Received Quality (RSRQ), secondary synchronization RSRP (SS-RSRP), SS-RSRQ, signal-to-interference-and-noise ratio (SINR), RS-SINR, SS-SINR, CSI-RSRP, CSI-RSRQ, received signal strength indicator (RSSI), acquisition of system information (SI), cell global ID (CGI) acquisition, Reference Signal Time Difference (RSTD), UE RX-TX time difference measurement, Radio Link Monitoring (RLM), which comprises Out of Synchronization (out of sync) detection and In Synchronization (in-sync) detection etc.

The UE is typically configured by the network (e.g. via RRC message) with measurement configuration and measurement reporting configuration e.g. measurement gap pattern, carrier frequency information, types of measurements (e.g. RSRP etc), higher layer filtering coefficient, time to trigger report, reporting mechanism (e.g. periodic, event triggered reporting, event triggered periodic reporting etc) etc.

The measurements are done for various purposes. Some example measurement purposes are: UE mobility (e.g. cell change, cell selection, cell reselection, handover, RRC connection re-establishment etc), UE positioning or location determination self-organizing network (SON), minimization of drive tests (MDT), operation and maintenance (O&M), network planning and optimization etc.

Relaxed Measurements

The relaxed monitoring criteria for a neighbour cell are specified in TS 36.304 v16.4.0. In RRC idle and RRC inactive states, the UE can be configured to relax neighbour cell measurements (e.g. for cell reselection) when the UE meets one or more relaxed measurement criteria. The UE can be configured for applying relaxed measurements via higher layer signalling e.g. in system information block (SIB) such as in SIB2. Examples of criteria are UE in low mobility, UE not-at-cell-edge, combined criterion (e.g. UE in low mobility AND not-at-cell-edge) etc.

Relaxed measurement criterion for UE with low mobility may be defined as follows:

The relaxed measurement criterion for UE with low mobility is fulfilled when the following condition is met for the serving cell of the UE:

$$(Srxlev_{Ref} - Srxlev) < S_{SearchDeltaP},$$

Where:

Srxlev=current Srxlev value of the serving cell (dB).

$Srxlev_{Ref}$=reference Srxlev value of the serving cell (dB), set as follows:

After selecting or reselecting a new cell, or

If $(Srxlev - Srxlev_{Ref}) > 0$, or

If the relaxed measurement criterion has not been met for a duration of $T_{SearchDeltaP}$:

Then the UE set value of $Srxlev_{Ref}$ to the current Srxlev value of the serving cell.

Srxlev is further defined as follows:

$$Srxlev = Q_{rxlevmeas} - (Q_{rxlevmin} + Q_{rxlevminoffset}) - P_{compensation} - Qoffset_{temp}$$

Where:

Srxlev: It is the cell selection received (RX) level value (dB)

$Q_{rxlevmeas}$: It is the measured cell RX level value (RSRP)

$Q_{rxlevmin}$ is the minimum required RX level in the cell (dBm). It is signalled by the cell.

$Q_{rxlevminoffset}$ is the offset to the signalled Qrxlevmin. It is signalled by the cell.

$Qoffset_{temp}$: is the offset temporarily applied to a cell. It is signalled by the cell.

Relaxed measurement criterion for UE not at cell edge may be defined as follows: The relaxed measurement criterion for UE not at cell edge is fulfilled when the following condition is met for the serving cell of the UE:

$$Srxlev > S_{SearchThresholdP},$$

$$\text{and, } Squal > S_{SearchThresholdQ}, \text{ if } S_{SearchThresholdQ} \text{ is configured,}$$

Where:

Srxlev=current Srxlev value of the serving cell (dB).

Squal=current Squal value of the serving cell (dB).

Squal is further defined as follows:

$$Squal = Q_{qualmeas} + Q_{qualminoffset}) - Qoffset_{temp}$$

Where:

Squal: It is the cell selection quality value (dB)

$Q_{qualmeas}$: It is the measured cell quality level value (RSRQ)

$Q_{qualmin}$ is the minimum required quality level in the cell (dB). It is signalled by the cell.

$Q_{qualminoffset}$ is the offset to the signalled Qqualmin. It is signalled by the cell.

Relaxed Measurement Requirements:

For example the UE may be allowed to relax measurement requirements provided that it is configured with lowMobilityEvaluation IE and also meets the low mobility criterion as defined above. In another example the UE is allowed to relax measurement requirements provided that it is configured with cellEdgeEvaluation IE and also meets the not at cell edge as defined above. In another example the UE is allowed to relax measurement requirements provided that it is configured with combineRelaxedMeasCondition IE also meets the low mobility criterion and not at cell edge as defined above. The parameters/IE lowMobilityEvaluation, cellEdgeEvaluation and combineRelaxedMeasCondition are defined in TS 38.331 v16.4.1.

The UE is allowed to relax one or more of neighbour cell measurements e.g. intra-frequency measurements, inter-frequency and inter-RAT measurements when the UE meets the relaxed criteria. The measurement relaxation may be realized by extending the measurement time compared to the measurement time when no relaxation is applied or by not performing any neighbour cell measurements. Examples of measurement time are cell detection time (Tdetect) measurement period (Tmeasure), evaluation time (Tevaluate) etc. For example, as shown in table 1, when the UE is configured with lowMobilityEvaluation and also meets low mobility criterion then the UE performs intra-frequency neighbour cell measurements (e.g. $T_{detect,NR\_Intra}$, $T_{measure,NR\_Intra}$ and $T_{evaluate,NR\_Intra}$) with relaxation by applying scaling factor K1=3 i.e. where K1=1 when no relaxation is applied.

TABLE 1

| $T_{detect,\ NR\_Intra}$, $T_{measure,\ NR\_Intra}$ and $T_{evaluate,\ NR\_Intra}$ | | | | | |
|---|---|---|---|---|---|
| DRX cycle length [s] | Scaling Factor (N1) FR1 | Scaling Factor (N1) FR2[Note1] | $T_{detect,\ NR\_Intra}$ [s] (number of DRX cycles) | $T_{measure,\ NR\_Intra}$ [s] (number of DRX cycles) | $T_{evaluate,\ NR\_Intra}$ [s] (number of DRX cycles) |
| 0.32 | 1 | 8 | 11.52 × N1 × M2 × K1 (36 × N1 × M2 × K1) | 1.28 × N1 × M2 × K1 (4 × N1 × M2 × K1) | 5.12 × N1 × M2 × K1 (16 × N1 × M2 × K1) |
| 0.64 | | 5 | 17.92 × N1 × K1 (28 × N1 × K1) | 1.28 × N1 × K1 (2 × N1 × K1) | 5.12 × N1 × K1 (8 × N1 × K1) |
| 1.28 | | 4 | 32 × N1 × K1 (25 × N1 × K1) | 1.28 × N1 × K1 (1 × N1 × K1) | 6.4 × N1 × K1 (5 × N1 × K1) |
| 2.56 | | 3 | 58.88 × N1 × K1 (23 × N1 × K1) | 2.56 × N1 × K1 (1 × N1 × K1) | 7.68 × N1 × K1 (3 × N1 × K1) |

*Note1*

Applies for UE supporting power class 2&3&4. For UE supporting power class 1, N1 = 8 for all DRX cycle length.

Note 2:

M2 = 1.5 if SMTC periodicity of measured intra-frequency cell >20 ms; otherwise M2 = 1.

Note 3:

K1 = 3 is the measurement relaxation factor applicable for UE fulfilling the lowMobilityEvaluation [2] criterion.

SUMMARY

There currently exist certain challenge(s). The UE may in some situations need to perform high priority actions. Examples of such actions include performing a particular type of measurement for a particular purpose, e.g. a critical operation such as emergency services, positioning, neighbour cell relations etc. Specific examples of such measurements comprise public safety measurements, CGI measurements, UE Rx-Tx measurement, PRS-RSRP measurement, RSTD measurement etc. If the UE is configured to perform relaxed measurements the UE may not be able to perform the high priority actions successfully. For example, CGI measurements may not be provided to the network, or positioning procedures may fail, etc.

Certain aspects of the disclosure and their embodiments may provide solutions to these or other challenges. In this disclosure it is described how a UE which is capable of relaxed measurement behaviour would handle a situation where the UE is configured to perform certain types of measurements, such as CGI measurements, positioning measurements, etc.

For example, the UE may refrain from monitoring conditions for relaxed measurement reporting. Additionally or alternatively, the UE may monitor the relaxation criteria but suppress the transmission of reports. Additionally or alternatively, the UE may monitor the relaxation criteria and send the reports, but if the network (e.g., a network node) indicates to the UE that the UE can apply relaxed measurement requirements, the UE ignores such command. Additionally or alternatively, the UE may postpone the relaxation or the report until after the ongoing certain type of measurements or high-priority actions are completed ("important measurement"). Additionally or alternatively, the UE may indicate in the UE→gNB report whether the UE has important measurements that it must do. Additionally or alternatively, the UE may indicate non-fulfillment of relaxed measurement conditions (despite those relaxed measurement conditions actually being fulfilled.

A first aspect of the disclosure provides a method performed by a user equipment which is capable of operating in a relaxed measurement mode of operation. The method comprises: responsive to a determination that the user equipment is to perform or is performing one or more high-priority actions, refraining from operating in the relaxed measurement mode of operation.

Apparatus configured to perform the first aspect of the disclosure is also provided. For example, one suitable apparatus comprises a user equipment which is capable of operating in a relaxed measurement mode of operation. The user equipment comprises processing circuitry configured to cause the user equipment to, responsive to a determination that the user equipment is to perform or is performing one or more high-priority actions, refrain from operating in the relaxed measurement mode of operation.

A second aspect of the disclosure provides a method performed by a network node. The method comprises: receiving a report from a user equipment indicating fulfilment of one or more criteria for the user equipment to enter a relaxed measurement mode of operation. The report further comprises an indication that the user equipment is performing or is to perform one or more high-priority actions. The method further comprises refraining from immediately instructing the user equipment to enter the relaxed measurement mode of operation.

Apparatus configured to perform the second aspect of the disclosure is also provided. For example, one suitable apparatus comprises a network node. The network node comprises processing circuitry configured to cause the network node to, receive a report from a user equipment indicating fulfilment of one or more criteria for the user equipment to enter a relaxed measurement mode of operation. The report further comprises an indication that the user equipment is performing or is to perform one or more high-priority actions. The processing circuitry is further configured to cause the network node to refrain from immediately instructing the user equipment to enter the relaxed measurement mode of operation.

Certain embodiments may provide one or more of the following technical advantage(s). For example, the embodiments may ensure that the UE can save power by applying a relaxed measurement behaviour while not compromising its ability to perform high priority actions such as CGI reporting, positioning procedures, etc.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Embodiments are provided by way of example to convey the scope of the subject matter to those skilled in the art.

Figure 1:
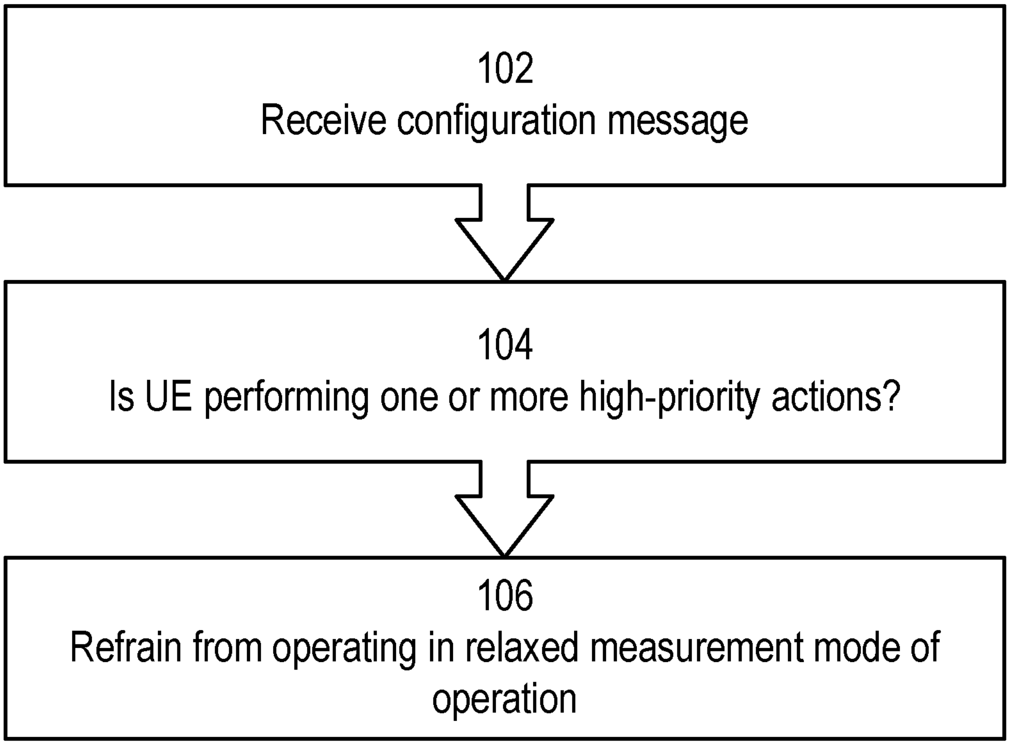
FIG. 1 is a flowchart of a method performed by a wireless device according to embodiments of the disclosure.

FIG. 1 depicts a method in accordance with particular embodiments. The method 1 may be performed by a UE or wireless device (e.g. the UE 312 or UE 400 as described later with reference to FIGS. 3 and 4 respectively).

The method begins at step 102, in which the UE receives one or more configuration message from a network node (e.g., a serving network node). The configuration message(s) may be received via broadcast (e.g., system information), multicast, or dedicated (e.g., RRC) signalling.

According to some embodiments of the disclosure, the one or more configuration messages comprise an indication of one or more criteria that the UE should monitor for entry to a relaxed measurement mode of operation.

Thus the UE monitors one or more criteria or conditions to determine whether it should enter the relaxed measurement mode of operation. In some embodiments, upon fulfilment of the one or more criteria, the UE may transmit a report to the network node indicating that the criteria have been fulfilled. The network node may subsequently instruct the UE to enter the relaxed measurement mode of operation, based on the report received from the UE.

One or more of these criteria or conditions may be configured by the network, and thus the configuration message(s) may comprise indications of the criteria. At least one of the one or more criteria may relate to mobility of the user equipment, and may specify that mobility of the user equipment is low. One example of such a criterion is described above in the section entitled "Relaxed measurements"; see the relaxed measurement criterion for UE with low mobility. Alternatively or additionally, the conditions could for example be that a signal measurement at the UE is within a certain boundary for a certain period of time. The UE would then measure the signal and monitor that it is within the boundary (e.g. thresholds). In another example the UE meets the conditions for relaxation if the UE measured signal level has not changed by more than certain threshold (Hm) over certain time period (T1). In another example the UE meets the conditions for relaxation if the UE speed remains below certain threshold (Hs) over certain time period (T2). Examples of the measured signal level are signal strength (e.g. SS-RSRP, path loss), signal quality (e.g. SS-RSRQ, SS-SINR etc) etc. The parameters Hm, Hs, T1 and T2 can be pre-defined or configured by the network node in the configuration message(s).

At least one of the criteria may relate to a location of the UE. For example, the one or more criteria comprise a second criterion that the user equipment is located away from a cell edge. One example of this is described above in the section entitled "Relaxed measurements" above; see relaxed measurement criterion for UE not at cell edge. Thus the location may also be determined based on radio measurements by the UE.

In further examples, the one or more criteria comprise a criterion that the user equipment is configured with discontinuous reception; a criterion that the user equipment is configured with a discontinuous reception cycle that exceeds a threshold; and/or a criterion that the user equipment is configured with a secondary cell, SCell, measurement cycle that exceeds a threshold.

Any of the criteria discussed above may be applied individually or in any combination. In the latter case, the UE may determine that it is eligible to enter the relaxed measurement mode of operation upon the combination of criteria being met.

According to further embodiments of the disclosure, the one or more configuration messages comprise an indication of the measurements that should be performed by the UE while operating in the relaxed measurement mode of operation. For example, such indications may comprise indications of the particular measurements which are to be relaxed, or may comprise a factor by which those measurements are to be relaxed, or may comprise new parameters which are more relaxed than parameters for a second, or normal measurement mode of operation, different from the relaxed measurement mode of operation. For example, the user equipment may perform measurements less frequently in the relaxed measurement mode of operation than in the second measurement mode of operation. The configuration message(s) may therefore comprise an indication of a lower frequency or periodicity of the measurements (or a scaling factor which alters the frequency or periodicity of the measurements). In another example, the user equipment may perform measurements over a longer period of time than in the second measurement mode of operation, and thus the configuration message(s) may comprise an indication of the longer period of time (or a scaling factor which alters the period of time over which the measurements are taken). In one example, the user equipment may perform measurements only on non-serving cells over a longer period of time than in the second measurement mode of operation. The user equipment may perform measurements with an accuracy worse than in the second measurement mode of operation, and thus the configuration message(s) may comprise an indication of the lower accuracy requirements (or a scaling factor by which the accuracy requirements can be altered). In another example, the user equipment may perform measurements on fewer cells, beams or reference signals than in the second measurement mode of operation, and thus the configuration message(s) may comprise an indication of the reduced number of cells, beams or reference signals on which measurements are to be performed (or a scaling factor which alters the number of cells, beams or reference signals). The user equipment may refrain from performing measurements on cells of at least one non-serving carrier while operating in the relaxed measurement mode of operation, and thus the configuration message may comprise an indication that the user equipment should behave in that manner. The user equipment may perform measurements in the relaxed measurement mode of operation while meeting a requirement which is less stringent than a reference requirement, and thus the configuration message(s) may comprise an indication of the less strict requirement (or a scaling factor by which the reference requirement can be reduced). The user equipment may perform measurements only on a primary serving cell, or refrain from performing measurements on non-serving cells while operating in the relaxed measurement mode of operation, and thus the configuration message(s) may comprise an indication that the user equipment should behave in that manner. The user equipment may transmit measurement reports less frequently than in the second measurement mode of operation, and thus the configuration message(s) may comprise an indication of the reduced frequency or periodicity of report transmission (or a scaling factor by which the report frequency of the second measurement mode of operation should be reduced).

In one example, the relaxed measurement mode of operation may comprise an extended measurement time (Tme) over which a measurement is performed. Where Tme is related to a reference measurement time (Tmr) as described below with few examples:

In one example Tme is longer than a reference measurement time (Tmr) for performing the same measurement e.g. SS-RSRP.

In one specific example Tme=1600 ms while Tmr=400 ms for the same measurement e.g. SS-RSRP.

In another example Tme and Tmr are related to each by a function e.g.

$$Tme=f(K,Tmr)\text{; where } K \text{ is a scaling factor.}$$

Examples of function f(.) are maximum, product, sum etc. In one specific example:

$$Tme=K*Tmr\text{; where } K>1 \text{ e.g. } K=4.$$

In one example Tmr is measurement time for performing a measurement when the UE is not configured with relaxed measurements.

In another example Tmr is pre-defined or configured by the network node.

According to yet further embodiments of the disclosure, the one or more configuration messages comprise an indication of one or more high-priority actions, which the UE is to use to determine whether to refrain from operating in the relaxed measurement mode of operation.

According to embodiments of the disclosure, the one or more high-priority actions may comprise performance of one or more high-priority measurements. The high-priority actions may also be called high-priority measurements and/or critical measurements herein. A high-priority measurement may be a measurement performed by the user equipment for a critical purpose (such as one or more of: positioning; beam failure detection; candidate beam detection; radio link monitoring; radio link failure; emergency services; early measurement reporting; cell selection; cell change; self-organizing network configuration; automatic neighbour relations; time and/or frequency tracking or synchronization; measurement for active Transmission Configuration Indicator switching and cell global identifier acquisition). Early measurement reporting may comprise any one or more of: measurement in idle mode for carrier aggregation; measurement in inactive mode for carrier aggregation; measurement in idle mode for dual connectivity and measurement in inactive mode for dual connectivity. Cell change may comprise any one or more of: cell reselection; handover; serving cell change, handover with PSCell change RRC release with direction and RRC connection re-establishment.

In other embodiments a high-priority measurement may be a measurement performed by the user equipment only in a second (e.g., normal) measurement mode of operation different from the relaxed measurement mode of operation. In other embodiments a high-priority measurement may be a measurement performed by the user equipment while meeting a reference requirement.

The reference requirement for a high-priority measurement may be more stringent than a reference requirement for the measurement performed in the relaxed measurement mode of operation.

Note that any of the parameters, conditions, high-priority actions or other information described above may alternatively be pre-configured in the UE rather than configured by the network. For example, the information may be required for compliance with one or more wireless standards, and thus pre-programmed in the UE by the device manufacturer.

In step 104, the UE determines whether it is performing one or more of the high-priority actions, whether it is about to perform one or more of the high-priority actions, whether it is expected to perform one or more of the high-priority actions, and/or whether it is configured to perform one or more of the high-priority actions. Upon determining that the UE is performing, is about to perform, is expected to perform, and/or is configured to perform one or more of the high-priority actions, the method proceeds to step 106.

In step 106, the UE refrains from operating in the relaxed measurement mode of operation. The UE may refrain from operating in (or entering) the relaxed measurement mode of operation in various ways.

In one set of embodiments (see, e.g., "Embodiment group A" described below), the UE refrains from monitoring the criteria for entering the relaxed measurement mode of operation. Once the high-priority actions are completed, stopped, no longer expected to take place, or no longer configured, the UE may continue to monitor the criteria for entering the relaxed measurement mode of operation.

According to these embodiments, the UE may refrain from monitoring or evaluating such criteria or conditions. This ensures that the UE will not send a report to the network that indicates that the UE fulfills relaxed measurement criteria and hence avoids that the network configures the UE to apply relaxed measurement behaviour. This therefore ensures that the UE will not apply relaxed measurement behaviour if the UE has high priority actions that the UE must do.

The UE may upon starting (or being about to start) the high priority actions refrain from performing the monitoring of the relaxed measurement conditions. And upon stopping the high priority actions the UE may start monitoring the conditions.

In one example, the UE may suspend or postpone the monitoring of relaxed measurement conditions if the UE is performing or expected to perform the high priority actions. The UE may resume the monitoring after completing the high priority actions.

In another example, the UE may stop, suspend or postpone the monitoring of relaxed measurement conditions based on whether the UE is configured with DRX cycle or not. For example the UE may stop, suspend or postpone the monitoring of relaxed measurement conditions if the UE is configured with DRX cycle; but does not stop, suspend or postpone the monitoring of relaxed measurement conditions if the UE is not configured with DRX cycle.

In another example, the ULE may stop, suspend or postpone the monitoring of relaxed measurement conditions based on length of the configured DRX cycle. For example the UE may stop, suspend or postpone the monitoring of relaxed measurement conditions if the UE is configured with DRX cycle longer than a threshold (Hd); but does not stop, suspend or postpone the monitoring of relaxed measurement conditions if the UE is configured with DRX cycle≤Hd.

In another example, the ULE may stop, suspend or postpone the monitoring of relaxed measurement conditions based on length of the configured SCell measurement cycle. The UE is configured with the SCell measurement cycle for performing measurements on SCell when the SCell is deactivated. For example the UE may stop, suspend or postpone the monitoring of relaxed measurement conditions if the UE is configured with SCell measurement cycle longer than a threshold (Hc); but does not stop, suspend or postpone the monitoring of relaxed measurement conditions if the UE is configured with SCell measurement cycle≤Hc.

The advantage of applying these embodiments, beside the fact that UE does not enter the relaxed measurement mode of operation, is that the UE power consumption is also reduced since the UE does not monitor the criteria.

In another set of embodiments (see, e.g., "Embodiment group B" described below), the UE may refrain from reporting to the network node that the criteria or conditions for entering the relaxed measurement mode of operation have been complied with. Thus, in such embodiments, the UE may or may not monitor the criteria. However, in either case, no report is sent to the network. Thus the network does not learn that the UE is eligible for entering the relaxed measurement mode of operation and does not instruct the UE to enter that mode of operation.

This ensures that when the UE needs to do high priority actions, the UE would not send a report to the network saying that the UE shall apply relaxed measurement behaviour. The UE does not send the report (indicating that it is eligible to apply relaxed measurements or indicating that it has met the relaxed measurement conditions), even if the UE is in a situation where conditions for sending such report are fulfilled. Consequently, the network would also not configure the UE to apply relaxed measurement behaviour (i.e., to enter the relaxed measurement mode of operation).

In a further example, the UE monitors or evaluates the relaxation conditions, but postpones the reporting of the result to the network node until the high priority actions are completed. The advantage of delaying or postponing the reporting compared to suppressing (as in previous example) is that UE does not have to re-do the evaluation after completing the high-priority actions, thus avoiding unnecessary power consumption in the UE.

In a further set of embodiments (see, e.g., "Embodiment group C" described below), the UE ignores an instruction from a network node to enter the relaxed measurement mode of operation. According to this embodiment, the UE would ignore any command received from the network which indicates that the UE shall apply a relaxed measurement behaviour, if the UE has high priority actions that the UE must do.

This means that the UE may monitor conditions for sending a report that says that the UE fulfils conditions for relaxed measurement even when the UE perform high priority actions. It even means that the UE may send such report to the network. But if the network sends a command to the UE (e.g. in response to the UE report) indicating that the UE shall apply the relaxed measurement behaviour, then the UE will not apply such behaviour in case the UE must perform high priority actions.

Since the network node that sends the instruction to enter the relaxed measurement mode of operation may not be aware of the actual conditions in the UE (e.g. change in mobility since reporting was done, request to perform certain types of measurements received from a third party node) etc, the UE is allowed to discard the instruction from the NW node.

The UE behaviour of not applying the relaxed measurement (ignoring network node command) may not be defined. This is to enable the network node (e.g. serving base station) to know when the UE may send measurement reports. For example this allows the network node to allocate or reserve resources for measurement reports, predict UE mobility such as expected cell change etc. In the relaxed measurement mode of operation, the measurement reports will be sent less frequently compared to the normal or second measurement mode of operation (i.e. where no relaxation is applied).

In another set of embodiments (see, e.g., "Embodiment group D" described below), the UE may refrain from operating in the relaxed measurement mode of operation until the one or more high-priority actions are stopped, completed, no longer expected to happen, or no longer configured. Upon the one or more high-priority actions being stopped, completed, no longer expected to happen, or no longer configured, the UE enters the relaxed measurement mode of operation.

This is beneficial for example if the high priority actions will be completed after some time T, then the UE can apply the relaxed measurement behaviour after the time T. The time, T, can be pre-defined or configured by the network node. The UE may still perform the monitoring and sending of the report, any may also abide by an instruction from the network node to enter the relaxed measurement mode of operation, but the UE does not apply such behaviour when the UE needs to perform a high priority action. Comparing to the preceding embodiments, the UE can directly apply the relaxed measurement behaviour as soon as the high priority actions are completed. This embodiment also enables a UE, which is currently applying a relaxed measurement behaviour, to pause the relaxed measurement behaviour for the duration of a high priority action that needs to be performed.

As described above, the UE may be configured to send a report to the network whereby the UE indicates that the UE fulfills conditions for applying a relaxed measurement behaviour. Upon which the network may configure the UE to apply such behaviour.

In another set of embodiments (see, e.g., "Embodiment group E" described below), the UE may refrain from operating in the relaxed measurement mode of operation by altering such a report to the network node to include an indication that the UE is performing, is about to perform, is expected to perform, or is configured to perform one or more high-priority actions.

Thus, in one embodiment, the UE indicates in the report that the UE needs to perform a high priority action. This may for example be a flag in the message which if set to a certain value (or if present in comparison to being absent) indicates that the UE is fulfilling the conditions for measurement relaxation, but the UE is performing (or will soon be performing, etc) high priority actions. The network can then determine that the UE will not apply a relaxed measurement behaviour due to the high priority action the UE needs to do.

The report may further comprise an indication of a time duration that the UE expects performance of the high priority action to take. For example, UE may predict or expect that it needs to perform the high priority action for a certain time period T. The network can, in response to receiving such time information, determine to configure the UE with relaxed measurement behaviour after the time duration. In a similar example, the NW node may adapt or modify the relaxed measurement configuration or configure the UE to apply a different level of relaxation (e.g. relaxation level B instead of relaxation level A where the requirements associated with B are more stringent than A) based on the received indication of the time period.

In one example, the UE may delay transmission of a report to a network node indicating fulfilment of the one or more criteria, such that the report is transmitted a time period after fulfillment of the one or more criteria. That is, after monitoring the relaxation criteria, the UE may not transmit a report indicating fulfillment of the criteria to the network immediately. Instead, the reporting of the result of the criteria may be done after a certain time period, e.g. after 400 ms or 1 seconds. The advantage of applying such hysteresis or delay is to avoid any high level activities (or high-priority actions) being triggered directly after reporting.

In a yet further set of embodiments (see, e.g., "Embodiment group F" described below), the UE may refrain from operating in the relaxed measurement mode of operation by transmitting a report to the network node indicating non-fulfilment of the criteria for entering the relaxed measurement mode of operation, whether or not those criteria are actually fulfilled.

For example, the UE may, in response to determining that the UE must perform a high priority action signal to the network that the UE no longer fulfills the conditions for measurement relaxation. For example, the UE may at first be in a situation where it is eligible for measurement relaxation and has therefore signaled to the network that the UE fulfills such criteria. However, if at a later point in time the UE determines that it must perform a high priority action, the UE may signal to the network that the UE no longer fulfills the conditions for applying a relaxed measurement behaviour.

This means that the UE may send a report saying that the UE does not fulfill the conditions for relaxed measurements, even if the UE does so. But instead the UE triggers the report in response to determining that the UE must perform a high priority action.

The UE may in the report indicate to the network that the reason for sending the report is that the UE needs to perform a high priority action, as opposed to that the UE no longer fulfills the conditions for relaxed measurements. For example, the UE may transmit information about the high priority action or task (e.g. positioning measurement, CGI reading etc) due to which the UE indicates that it no longer fulfills the conditions for relaxed measurements.

The network may in response to receiving such report configure the UE to no longer apply the relaxed measurement behaviour.

Figure 2:
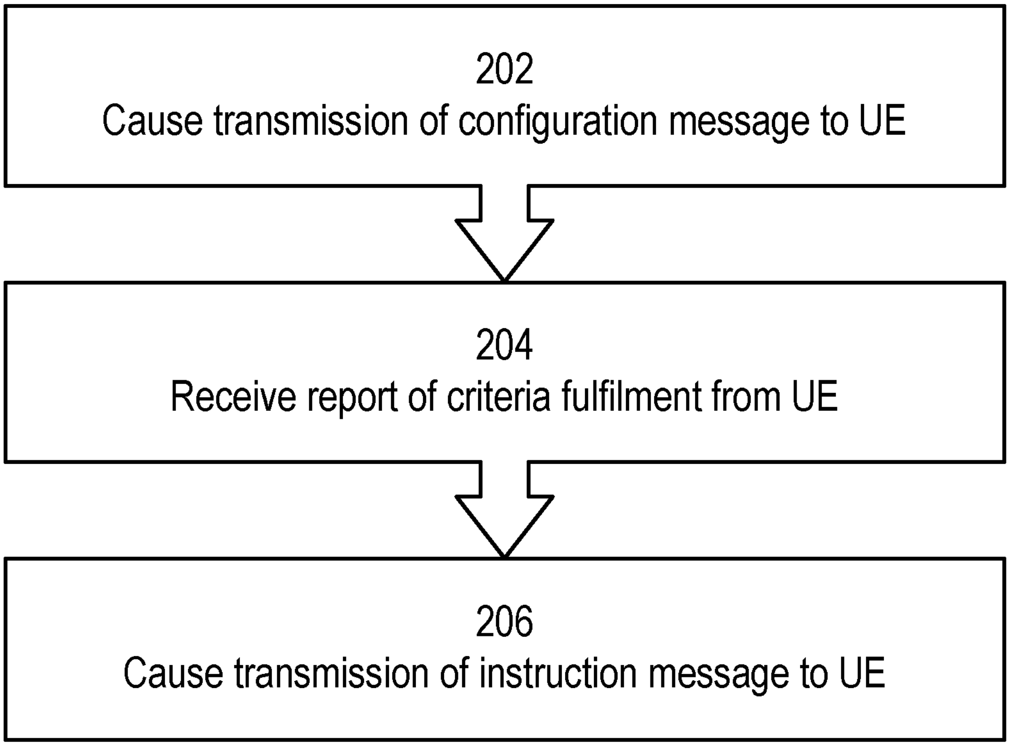
FIG. 2 is a flowchart of a method performed by a network node according to embodiments of the disclosure.

FIG. 2 depicts a method in accordance with particular embodiments. The method may be performed by a network node or base station (e.g. the network node 310 or network node 500 as described later with reference to FIGS. 3 and 5 respectively).

The method begins at step 202, in which the network node causes the transmission of one or more configuration messages to a UE. For example, the network node may be a serving base station for the UE. The configuration message(s) may be received via broadcast (e.g., system information), multicast, or dedicated (e.g., RRC) signalling.

According to some embodiments of the disclosure, the one or more configuration messages comprise an indication of one or more criteria that the UE should monitor for entry to a relaxed measurement mode of operation.

Thus the UE monitors one or more criteria or conditions to determine whether it should enter the relaxed measurement mode of operation. In some embodiments, upon fulfilment of the one or more criteria, the UE may transmit a report to the network node indicating that the criteria have been fulfilled. The network node may subsequently instruct the UE to enter the relaxed measurement mode of operation, based on the report received from the UE.

One or more of these criteria or conditions may be configured by the network, and thus the configuration message(s) may comprise indications of the criteria. At least one of the one or more criteria may relate to mobility of the user equipment, and may specify that mobility of the user equipment is low. One example of such a criterion is described above in the section entitled "Relaxed measurements"; see the relaxed measurement criterion for UE with low mobility. Alternatively or additionally, the conditions could for example be that a signal measurement at the UE is within a certain boundary for a certain period of time. The UE would then measure the signal and monitor that it is within the boundary (e.g. thresholds). In another example the UE meets the conditions for relaxation if the UE measured signal level has not changed by more than certain threshold (Hm) over certain time period (T1). In another example the UE meets the conditions for relaxation if the UE speed remains below certain threshold (Hs) over certain time period (T2). Examples of the measured signal level are signal strength (e.g. SS-RSRP, path loss), signal quality (e.g. SS-RSRQ, SS-SINR etc) etc. The parameters Hm, Hs, T1 and T2 can be pre-defined or configured by the network node in the configuration message(s).

At least one of the criteria may relate to a location of the UE. For example, the one or more criteria comprise a second criterion that the user equipment is located away from a cell edge. One example of this is described above in the section entitled "Relaxed measurements" above; see relaxed measurement criterion for UE not at cell edge. Thus the location may also be determined based on radio measurements by the UE.

In further examples, the one or more criteria comprise a criterion that the user equipment is configured with discontinuous reception; a criterion that the user equipment is configured with a discontinuous reception cycle that exceeds a threshold; and/or a criterion that the user equipment is configured with a secondary cell, SCell, measurement cycle that exceeds a threshold.

Any of the criteria discussed above may be applied individually or in any combination. In the latter case, the UE may determine that it is eligible to enter the relaxed measurement mode of operation upon the combination of criteria being met.

According to further embodiments of the disclosure, the one or more configuration messages comprise an indication of the measurements that should be performed by the UE while operating in the relaxed measurement mode of operation. For example, such indications may comprise indications of the particular measurements which are to be relaxed, or may comprise a factor by which those measurements are to be relaxed, or may comprise new parameters which are more relaxed than parameters for a second, or normal measurement mode of operation, different from the relaxed measurement mode of operation. For example, the user equipment may perform measurements less frequently in the relaxed measurement mode of operation than in the second measurement mode of operation. The configuration message (s) may therefore comprise an indication of a lower frequency or periodicity of the measurements (or a scaling factor which alters the frequency or periodicity of the measurements). In another example, the user equipment may perform measurements over a longer period of time than in the second measurement mode of operation, and thus the configuration message(s) may comprise an indication of the longer period of time (or a scaling factor which alters the period of time over which the measurements are taken). In one example, the user equipment may perform measurements only on non-serving cells over a longer period of time than in the second measurement mode of operation. The user equipment may perform measurements with an accuracy worse than in the second measurement mode of operation, and thus the configuration message(s) may comprise an indication of the lower accuracy requirements (or a scaling factor by which the accuracy requirements can be altered). In another example, the user equipment may perform measurements on fewer cells, beams or reference signals than in the second measurement mode of operation, and thus the configuration message(s) may comprise an indication of the reduced number of cells, beams or reference signals on which measurements are to be performed (or a scaling factor which alters the number of cells, beams or reference signals). The user equipment may refrain from performing measurements on cells of at least one non-serving carrier while operating in the relaxed measurement mode of operation, and thus the configuration message may comprise an indication that the user equipment should behave in that manner. The user equipment may perform measurements in the relaxed measurement mode of operation while meeting a requirement which is less stringent than a reference requirement, and thus the configuration message(s) may comprise an indication of the less strict requirement (or a scaling factor by which the reference requirement can be reduced). The user equipment may perform measurements only on a primary serving cell, or refrain from performing measurements on non-serving cells while operating in the relaxed measurement mode of operation, and thus the configuration message(s) may comprise an indication that the user equipment should behave in that manner. The user equipment may transmit measurement reports less frequently than in the second measurement mode of operation, and thus the configuration message(s) may comprise an indication of the reduced frequency or periodicity of report transmission (or a scaling factor by which the report frequency of the second measurement mode of operation should be reduced).

In one example, the relaxed measurement mode of operation may comprise an extended measurement time (Tme) over which a measurement is performed. Where Tme is related to a reference measurement time (Tmr) as described below with few examples:

In one example Tme is longer than a reference measurement time (Tmr) for performing the same measurement e.g. SS-RSRP.

In one specific example Tme=1600 ms while Tmr=400 ms for the same measurement e.g. SS-RSRP.

In another example Tme and Tmr are related to each by a function e.g.

$$Tme=f(K,Tmr);\ \text{where } K \text{ is a scaling factor.}$$

Examples of function f(.) are maximum, product, sum etc. In one specific example:

$$Tme=K*Tmr;\ \text{where } K>1 \text{ e.g. } K=4.$$

In one example Tmr is measurement time for performing a measurement when the UE is not configured with relaxed measurements.

In another example Tmr is pre-defined or configured by the network node.

According to yet further embodiments of the disclosure, the one or more configuration messages comprise an indication of one or more high-priority actions, which the UE is to use to determine whether to refrain from operating in the relaxed measurement mode of operation.

According to embodiments of the disclosure, the one or more high-priority actions may comprise performance of one or more high-priority measurements. The high-priority actions may also be called high-priority measurements and/or critical measurements herein. A high-priority measurement may be a measurement performed by the user equipment for a critical purpose (such as one or more of: positioning; beam failure detection; candidate beam detection; radio link monitoring; radio link failure; emergency services; early measurement reporting; cell selection; cell change; self-organizing network configuration; automatic neighbour relations; time and/or frequency tracking or synchronization; measurement for active Transmission Configuration Indicator switching and cell global identifier acquisition). Early measurement reporting may comprise any one or more of: measurement in idle mode for carrier aggregation; measurement in inactive mode for carrier aggregation; measurement in idle mode for dual connectivity and measurement in inactive mode for dual connectivity. Cell change may comprise any one or more of: cell reselection; handover; serving cell change, handover with PSCell change RRC release with direction and RRC connection re-establishment.

In other embodiments a high-priority measurement may be a measurement performed by the user equipment only in a second (e.g., normal) measurement mode of operation different from the relaxed measurement mode of operation. In other embodiments a high-priority measurement may be a measurement performed by the user equipment while meeting a reference requirement.

The reference requirement for a high-priority measurement may be more stringent than a reference requirement for the measurement performed in the relaxed measurement mode of operation.

Note that any of the parameters, conditions, high-priority actions or other information described above may alternatively be pre-configured in the UE rather than configured by the network. For example, the information may be required for compliance with one or more wireless standards, and thus pre-programmed in the UE by the device manufacturer. Thus step 202 (and also step 102) is optional.

As described above, the UE may be configured to send a report to the network whereby the UE indicates that the UE fulfills conditions for applying a relaxed measurement behaviour. Upon which the network may configure the UE to apply such behaviour.

In one of the embodiments described above with respect to step 106, the UE refrains from operating in the relaxed measurement mode of operation by altering such a report to the network node to include an indication that the UE is performing, is about to perform, is expected to perform, or is configured to perform one or more high-priority actions (see also “Embodiment group E” described below).

Thus in step 204, the network node receives a report from the UE indicating that the one or more criteria for entering the relaxed measurement mode of operation are fulfilled. The report also includes an indication that the UE is performing, is about to perform, is expected to perform, or is configured to perform one or more high-priority actions. This may for example be a flag in the message which if set to a certain value (or if present in comparison to being absent) indicates that the UE is fulfilling the conditions for measurement relaxation, but the UE is performing (or will soon be performing, etc) high priority actions.

In step 206, responsive to receipt of the indication that the UE is performing high-priority actions, the network node refrains from immediately instructing the UE to enter the relaxed measurement mode of operation. The network node may instead instruct the UE to enter the relaxed measurement mode of operation once an amount of time has passed. Especially in embodiments where the report received in step 204 comprises an indication of the amount of time that the high priority action is expected to take, the network node may instruct the UE to enter the relaxed measurement mode of operation once that amount of time has passed. For example, the network node may transmit an instruction message to the UE, once the amount of time has passed, instructing the UE to enter the relaxed measurement mode of operation (i.e., the transmission occurs after the amount of time). Alternatively, the network node may transmit an instruction message to the UE instructing the UE to enter the relaxed measurement mode of operation once the amount of time has passed. For example, the instruction message may itself comprise an indication of an amount of time that the UE should wait, or a time at which the UE is to enter the relaxed measurement mode of operation.

In a yet further set of embodiments (see, e.g., "Embodiment group F" described below), the network node may receive a report from the UE indicating non-fulfilment of the criteria for entering the relaxed measurement mode of operation, whether or not those criteria are actually fulfilled.

For example, the UE may, in response to determining that the UE must perform a high priority action signal to the network that the UE no longer fulfills the conditions for measurement relaxation. For example, the UE may at first be in a situation where it is eligible for measurement relaxation and has therefore signaled to the network that the UE fulfills such criteria. However, if at a later point in time the UE determines that it must perform a high priority action, the UE may signal to the network that the UE no longer fulfills the conditions for applying a relaxed measurement behaviour.

This means that the UE may send a report saying that the UE does not fulfill the conditions for relaxed measurements, even if the UE does so. But instead the UE triggers the report in response to determining that the UE must perform a high priority action.

The UE may in the report indicate to the network that the reason for sending the report is that the UE needs to perform a high priority action, as opposed to that the UE no longer fulfills the conditions for relaxed measurements. For example, the ULE may transmit information about the high priority action or task (e.g. positioning measurement, CGI reading etc) due to which the UE indicates that it no longer fulfills the conditions for relaxed measurements.

The network node may, in response to receiving such a report, configure the UE to no longer apply the relaxed measurement behaviour.

Embodiments of the disclosure are described further in the following passages.

Relaxed Measurements and High Priority Actions

In this disclosure it is described how a UE is capable of relaxed measurement behaviour wherein the UE can perform measurements in a relaxed manner. It is also discussed how the UE can determine that it has high priority actions which the UE must perform. The terms "relaxed measurements" and "higher priority actions" are elaborated on below:

In some embodiments the UE may be configured with relaxed measurements e.g. by a network node via higher layer signalling such as RRC, based on pre-defined rules etc. Examples of rules are: if the measured signal level (e.g. RSRP) by the UE does not change by more than certain threshold over certain time, if the UE speed remains below threshold for certain time etc. When configured with relaxed measurements the UE is allowed to perform measurements with relaxed requirements. This may also be called as relaxed mode or relaxed measurement mode. In the relaxed measurement mode, the UE is allowed to perform measurements while meeting relaxed requirements. Examples of requirements are measurement time, measurement accuracy, number of identified cells to measure per carrier, number of beams (e.g. SSBs) to measure etc. Examples of measurement time are cell detection time, measurement period of a measurement (e.g. SS-RSRP, SS-RSRQ, SS-SINR etc), SSB index acquisition time, measurement reporting delay, radio link monitoring (RLM) evaluation period (e.g. out of sync evaluation period, in sync evaluation period, beam detection evaluation period, candidate beam detection evaluation period, measurement period of L1-measurement (e.g. L1-RSRP, L1-SINR etc) etc).

In one example, relaxed requirements may comprise an extended measurement time (Tme) over which a measurement is performed when configured in relaxed measurement mode. Where Tme is related to a reference measurement time (Tmr) as described below with few examples:

In one example Tme is longer than a reference measurement time (Tmr) for performing the same measurement e.g. SS-RSRP.

In one specific example Tme=1600 ms while Tmr=400 ms for the same measurement e.g. SS-RSRP.

In another example Tme and Tmr are related to each by a function e.g.

$$Tme=f(K,Tmr);\ \text{where } K \text{ is a scaling factor.}$$

Examples of function f(.) are maximum, product, sum etc. In one specific example:

$$Tme=K*Tmr;\ \text{where } K>1 \text{ e.g. } K=4.$$

In one example Tmr is measurement time for performing a measurement when the UE is not configured with relaxed measurements.

In another example Tmr is pre-defined or configured by the network node.

High priority actions in the context of this disclosure can for example be certain measurements that the UE must perform e.g. when configured by the network. Measurements such as CGI measurements, positioning measurements, etc.

The high priority actions are interchangeably called as critical measurements, or certain types of measurements or measurements performed on a certain type of signal. One example of particular type of measurement is the measurement performed for particular purpose e.g. critical operation such as emergency services, positioning etc. Another example of particular type of measurement is the measurement performed using certain types of reference signals e.g.

positioning reference signals. Specific examples of positioning measurements include RSTD measurements, UE Rx-Tx time difference measurement, PRS-RSRP etc. Generally, the positioning measurements are more time critical than RRM measurements (e.g. used for mobility) and therefore may have higher priority.

The positioning measurements are performed on downlink positioning reference signal (PRS), which are periodically transmitted by the network (e.g. base station) in a PRS resource. One or more PRS resources are comprised in a PRS resource set. The PRS resource periodicity (Tprs) may vary between 4 slots to 20480 slots. The UE supporting positioning measurements may indicate via higher layer signalling (e.g. via RRC) that the UE is capable of performing positioning measurements. The UE may further indicate the type of positioning measurements it is capable of e.g. RSTD, PRS-RSRP and UE Rx-Tx time difference measurement. The UE may be configured by a network node (e.g. positioning node e.g. location management function (LMF)) via higher layer (e.g. LTE positioning protocol (LPP)) to perform positioning measurements including PRS configuration e.g. PRS BW, Tprs etc. The UE configured to perform positioning measurements may further inform the serving cell (e.g. serving gNB) that the UE is configured with positioning measurements. The UE may further request the serving cell (e.g. serving gNB) to configure the measurement gaps for positioning measurements.

The cell transmits CGI in a system information e.g. in SIB1. The UE needs to acquire SFN, SIB1 scheduling etc, which are transmitted in physical broadcast channel (PBCH), which in turn is transmitted in SSB. Therefore, to acquire the CGI of a cell, the UE needs to first acquire MIB of that cell. In summary the CGI measurement is performed by the UE on signals transmitted by the network node in system information e.g. MIB, SIB (e.g. SIB1) etc.

The embodiments herein can be applied also to other high priority actions which may not be possible to perform in case the UE is applying a relaxed measurement behaviour.

The UE can determine which are high priority actions (e.g. critical actions, critical measurements etc) based on one or more rules. The rules can be pre-defined or configured by the network node. This is explained with examples below:

For example, it may be pre-defined or configured that CGI acquisition is a high priority action.

In another example, it may be pre-defined or configured that certain type of CGI measurement is a high priority action e.g. CGI measurement for certain purpose. Examples of purpose are handover, ANR, SON etc.

In another example, it may be pre-defined or configured that positioning measurement is a high priority action.

In another example, it may be pre-defined or configured that certain type of positioning measurement is a high priority action e.g. RSTD.

In another example, it may be pre-defined or configured that positioning measurement for certain type of positioning method is a high priority action. Examples of type of positioning methods are multi round trip time (multi-RTT), DL time difference of arrival (DL-TDOA), DL angle of departure (DL-AoD) etc. For example UE Rx-Tx time difference, RSTD and PRS-RSRP may be configured for multi-RTT, DL-TDOA and DL-AoD respectively.

Embodiment Group A: UE Refrains from Monitoring Conditions for Relaxed Measurement Reporting As described above, the relaxed measurement behaviour may comprise the UE monitoring one or more conditions. The conditions can be pre-defined and/or configured by the network node. Upon fulfillment of the conditions the UE may consider itself eligible for measurement relaxation and thereby send a report to the network indicating that the UE is fulfilling the conditions for measurement relaxation.

According to one embodiment of the disclosure, the UE will refrain from monitoring such conditions if the UE must perform some high priority action, if the UE is currently performing any high priority actions, if the UE is configured to perform any high priority actions, or if the UE is expected to perform any high priority actions. The conditions could for example be that a signal measurement at the UE is within a certain boundary for a certain period of time. The UE would then measure the signal and monitor that it is within the boundary (e.g. thresholds). Other examples of conditions used in RRC IDLE mode are described above (see "Relaxed measurements" section). In another example the UE meets the conditions for relaxation if the UE measured signal level has not changed by more than certain threshold (Hm) over certain time period (T1). In another example the UE meets the conditions for relaxation if the UE speed remains below certain threshold (Hs) over certain time period (T2). Examples of the measured signal level are signal strength (e.g. SS-RSRP, path loss), signal quality (e.g. SS-RSRQ, SS-SINR etc) etc. The parameters Hm, Hs, T1 and T2 can be pre-defined or configured by the network node. However, according to this embodiment the UE may refrain from monitoring or evaluating such conditions. This ensures that the UE will not send a report to the network that indicates that the UE fulfills relaxed measurement behaviour and hence avoids the network configuring the UE to apply relaxed measurement behaviour. This therefore ensures that the UE will not apply relaxed measurement behaviour if the UE has high priority actions that the UE must do.

The UE may upon starting (or being about to start) the high priority actions refrain from performing the monitoring of the relaxed measurement conditions. And upon stopping the high priority actions the UE may start monitoring the conditions.

In one example, the UE may suspend or postpone the monitoring of relaxed measurement conditions if the UE is performing or expected to perform the high priority actions. The UE may resume the monitoring after completing the high priority actions.

In another example, the ULE may stop, suspend or postpone the monitoring of relaxed measurement conditions based on whether the UE is configured with DRX cycle or not. For example the UE may stop, suspend or postpone the monitoring of relaxed measurement conditions if the UE is configured with DRX cycle; but does not stop, suspend or postpone the monitoring of relaxed measurement conditions if the UE is not configured with DRX cycle.

In another example, the ULE may stop, suspend or postpone the monitoring of relaxed measurement conditions based on length of the configured DRX cycle. For example the UE may stop, suspend or postpone the monitoring of relaxed measurement conditions if the UE is configured with DRX cycle longer than a threshold (Hd); but does not stop, suspend or postpone the monitoring of relaxed measurement conditions if the UE is configured with DRX cycle≤Hd.

In another example, the ULE may stop, suspend or postpone the monitoring of relaxed measurement conditions based on length of the configured SCell measurement cycle. The UE is configured with the SCell measurement cycle for performing measurements on SCell when the SCell is deactivated. For example the UE may stop, suspend or postpone the monitoring of relaxed measurement conditions if the UE is configured with SCell measurement cycle longer than a threshold (Hc); but does not stop, suspend or postpone the monitoring of relaxed measurement conditions if the UE is configured with SCell measurement cycle≤Hc.

The advantage of applying this embodiment, beside the fact that UE does not enter the relaxed mode, it also reduces the UE power consumption since UE does not monitor the criteria.

Embodiment Group B: UE Monitors the Criteria but Suppresses Reports

In one embodiment (in contrast to embodiment group A) the UE will, when high priority actions are required, anyway monitor the conditions used to determine if the UE is in a situation where the UE is eligible for relaxed measurements, but the UE would instead suppress sending any report to the network that would indicate that the UE fulfills the conditions.

This ensures that when the UE needs to do high priority actions, the UE would never send a report to the network saying that the UE shall apply relaxed measurement behaviour. The UE does not send the report (indicating that it is eligible to apply relaxed measurements or indicating that it has met the relaxed measurement conditions), even if the UE is in a situation where conditions for sending such report are fulfilled. Consequently, the network would also not configure the UE to apply relaxed measurement behaviour.

In one example, the UE monitors or evaluates the relaxation conditions, but postpones the reporting of the result to the network node until the high priority actions are completed. The advantage of delaying or postponing the reporting compared to suppressing (as in previous example) is that UE does not have to re-do the evaluation after completing the high-priority actions, this avoids unnecessary power consumption in the UE.

Embodiment Group C: UE Ignores any Command from the Network Indicating to Apply a Relaxed Measurement Behaviour According to this embodiment, the UE would ignore any command received from the network which indicates that the UE shall apply a relaxed measurement behaviour, if the UE has high priority actions that the UE must do.

This means that the UE may anyway monitor conditions for sending a report that says that the UE fulfils conditions for relaxed measurement even when the UE perform high priority actions. It even means that the UE may send such report to the network. But if the network sends a command to the UE (e.g. in response to the UE report) indicating that the UE shall apply the relaxed measurement behaviour, then the UE will not apply such behaviour in case the UE must perform high priority actions.

Since the NW node that sends the relaxation command may not be aware of the actual conditions in the UE (e.g. change in mobility since reporting was done, request to perform certain types of measurements received from a third party node) etc, the UE is allowed to discard the transmitted relaxation command from the NW node.

The UE behaviour of not applying the relaxed measurement (ignoring network node command) may not to be defined. This is to enable the network node (e.g. serving BS) to know when the UE may send measurement reports. For example this allows the network node to allocate or reserve resources for measurement reports, predict UE mobility such as expected cell change etc. In relaxed mode, the measurement reports will be sent less frequently compared to the normal mode (i.e. when no relaxation is applied).

Embodiment Group D: UE Postpones Measurement Relaxation Until after the High Priority Actions In one embodiment the UE will, in case the UE is configured to apply a relaxed measurement behaviour at the same time as the UE performs high priority actions, postpone applying such behaviour until after the high priority actions.

This is beneficial for example if the high priority actions will be completed after some time T, then the UE can apply the relaxed measurement behaviour after the time T. The time, T, can be pre-defined or configured by the network node. The UE may still perform the monitoring (compared to embodiment A) and sending of the report (compared to embodiment B) as well as apply a command indicating to apply a relaxed measurement behaviour (compared to embodiment C), but the UE will not apply such behaviour when the UE needs to perform a high priority action. Comparing to embodiments A-C above, the UE can directly apply the relaxed measurement behaviour as soon as the high priority actions are completed.

This embodiment also enables that if the UE is currently applying a relaxed measurement behaviour, and then a high priority action needs to be performed, the UE can pause the relaxed behaviour for the duration of the high priority action.

Embodiment Group E: UE Indicates in Relaxed Measurement Condition Fulfillment that the UE Must Perform High Priority Actions As described above, the UE may be configured to send a report to the network whereby the UE indicates that the UE fulfills conditions for applying a relaxed measurement behaviour. Upon which the network may configure the UE to apply such behaviour.

In one embodiment, the UE indicates in the report that the UE needs to perform a high priority action. This may for example be a flag in the message which if set to a certain value (or if present in comparison to being absent) indicates that the UE is fulfilling the conditions for measurement relaxation, but the UE is performing (or will soon be performing) high priority actions. The network can then determine that the UE will not apply a relaxed measurement behaviour due to the high priority action the UE needs to do.

It can indicate a time duration the UE expects that the high priority action needs to be performed. For example, that the UE expects that the UE need to perform the high priority action a certain time T. The network can in response to receiving such time information determine to configure the UE with relaxed measurement behaviour after the time duration. In a similar example, the NW node may adapt or modify the relaxed measurement configuration or configure the UE to apply a different level of relaxation (e.g. relaxation level B instead of relaxation level A where the requirements associated with B are more stringent than A) based on received indication.

In one example, after monitoring the relaxation criteria and the UE does not report the result immediately. Instead, the reporting of the result of the criteria is done after a certain time period, e.g. after 400 ms or 1 seconds. The advantage of applying such hysteresis is to avoid that any high level activities are trigger directly after reporting.

Embodiment Group F: Indicating Non-Fulfillment of Relaxed Measurement Conditions The UE may in response to determining that the UE must perform a high priority action signal to the network that the UE no longer fulfills the conditions for measurement relaxation. For example, the UE may at first be in a situation where it is eligible for measurement relaxation and has therefore signaled to the network that the UE fulfills such criteria. However, if at a later point in time the UE determines that it must perform a high priority action, the UE may signal to the network that the UE no longer fulfills the conditions for applying a relaxed measurement behaviour.

This means that the UE may send a report saying that the UE does not fulfill the conditions for relaxed measurements, even if the UE does so. But instead the UE triggers the report in response to determining that the UE must perform a high priority action.

The UE may in the report indicate to the network that the reason for sending the report is that the UE needs to perform a high priority action, as opposed to that the UE no longer fulfills the conditions for relaxed measurements. For example, the UE may transmit information about the high priority action or task (e.g. positioning measurement, CGI reading etc) due to which the UE indicates that it no longer fulfills the conditions for relaxed measurements.

The network may in response to receiving such report configure the UE to no longer apply the relaxed measurement behaviour.

Figure 3:
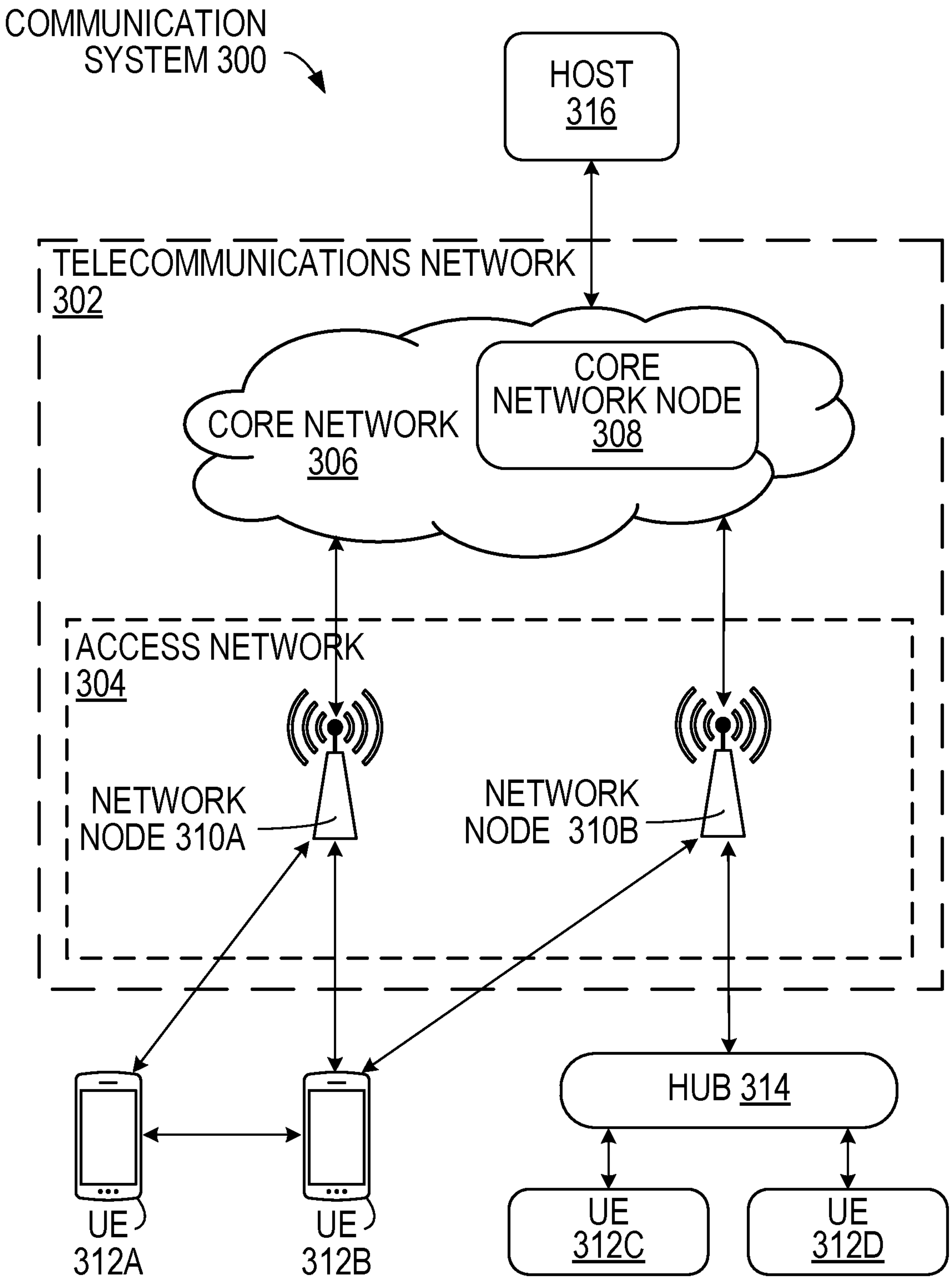
FIG. 3 shows an example of a communication system according to embodiments of the disclosure.

FIG. 3 shows an example of a communication system 300 in accordance with some embodiments.

In the example, the communication system 300 includes a telecommunication network 302 that includes an access network 304, such as a radio access network (RAN), and a core network 306, which includes one or more core network nodes 308. The access network 304 includes one or more access network nodes, such as network nodes 310*a* and 310*b* (one or more of which may be generally referred to as network nodes 310), or any other similar $3^{rd}$ Generation Partnership Project (3GPP) access node or non-3GPP access point. The network nodes 310 facilitate direct or indirect connection of user equipment (UE), such as by connecting UEs 312*a*, 312*b*, 312*c*, and 312*d* (one or more of which may be generally referred to as UEs 312) to the core network 306 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 300 may include any number of wired or wireless networks, network nodes, UEs, and/or any other components or systems that may facilitate or participate in the communication of data and/or signals whether via wired or wireless connections. The communication system 300 may include and/or interface with any type of communication, telecommunication, data, cellular, radio network, and/or other similar type of system.

The UEs 312 may be any of a wide variety of communication devices, including wireless devices arranged, configured, and/or operable to communicate wirelessly with the network nodes 310 and other communication devices. Similarly, the network nodes 310 are arranged, capable, configured, and/or operable to communicate directly or indirectly with the UEs 312 and/or with other network nodes or equipment in the telecommunication network 302 to enable and/or provide network access, such as wireless network access, and/or to perform other functions, such as administration in the telecommunication network 302.

In the depicted example, the core network 306 connects the network nodes 310 to one or more hosts, such as host 316. These connections may be direct or indirect via one or more intermediary networks or devices. In other examples, network nodes may be directly coupled to hosts. The core network 306 includes one more core network nodes (e.g., core network node 308) that are structured with hardware and software components. Features of these components may be substantially similar to those described with respect to the UEs, network nodes, and/or hosts, such that the descriptions thereof are generally applicable to the corresponding components of the core network node 308. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 316 may be under the ownership or control of a service provider other than an operator or provider of the access network 304 and/or the telecommunication network 302, and may be operated by the service provider or on behalf of the service provider. The host 316 may host a variety of applications to provide one or more services. Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 300 of FIG. 3 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 302 is a cellular network that implements 3GPP standardized features. Accordingly, the telecommunications network 302 may support network slicing to provide different logical networks to different devices that are connected to the telecommunication network 302. For example, the telecommunications network 302 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 312 are configured to transmit and/or receive information without direct human interaction. For instance, a UE may be designed to transmit information to the access network 304 on a predetermined schedule, when triggered by an internal or external event, or in response to requests from the access network 304. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example illustrated in FIG. 3, the hub 314 communicates with the access network 304 to facilitate indirect communication between one or more UEs (e.g., UE 312*c* and/or 312*d*) and network nodes (e.g., network node 310*b*). In some examples, the hub 314 may be a controller, router, a content source and analytics node, or any of the other communication devices described herein regarding UEs. For example, the hub 314 may be a broadband router enabling access to the core network 306 for the UEs. As another example, the hub 314 may be a controller that sends commands or instructions to one or more actuators in the UEs. Commands or instructions may be received from the UEs, network nodes 310, or by executable code, script, process, or other instructions in the hub 314. As another example, the hub 314 may be a data collector that acts as temporary storage for UE data and, in some embodiments, may perform analysis or other processing of the data. As another example, the hub 314 may be a content source. For example, for a UE that is a VR headset, display, loudspeaker or other media delivery device, the hub 314 may retrieve VR assets, video, audio, or other media or data related to sensory information via a network node, which the hub 314 then provides to the UE either directly, after performing local processing, and/or after adding additional local content. In still another example, the hub 314 acts as a proxy server or orchestrator for the UEs, in particular in if one or more of the UEs are low energy IoT devices.

The hub 314 may have a constant/persistent or intermittent connection to the network node 310*b*. The hub 314 may also allow for a different communication scheme and/or schedule between the hub 314 and UEs (e.g., UE 312*c* and/or 312*d*), and between the hub 314 and the core network 306. In other examples, the hub 314 is connected to the core network 306 and/or one or more UEs via a wired connection. Moreover, the hub 314 may be configured to connect to an M2M service provider over the access network 304 and/or to another UE over a direct connection. In some scenarios, UEs may establish a wireless connection with the network nodes 310 while still connected via the hub 314 via a wired or wireless connection. In some embodiments, the hub 314 may be a dedicated hub—that is, a hub whose primary function is to route communications to/from the UEs from/to the network node 310*b*. In other embodiments, the hub 314 may be a non-dedicated hub—that is, a device which is capable of operating to route communications between the UEs and network node 310*b*, but which is additionally capable of operating as a communication start and/or end point for certain data channels.

Figure 4:
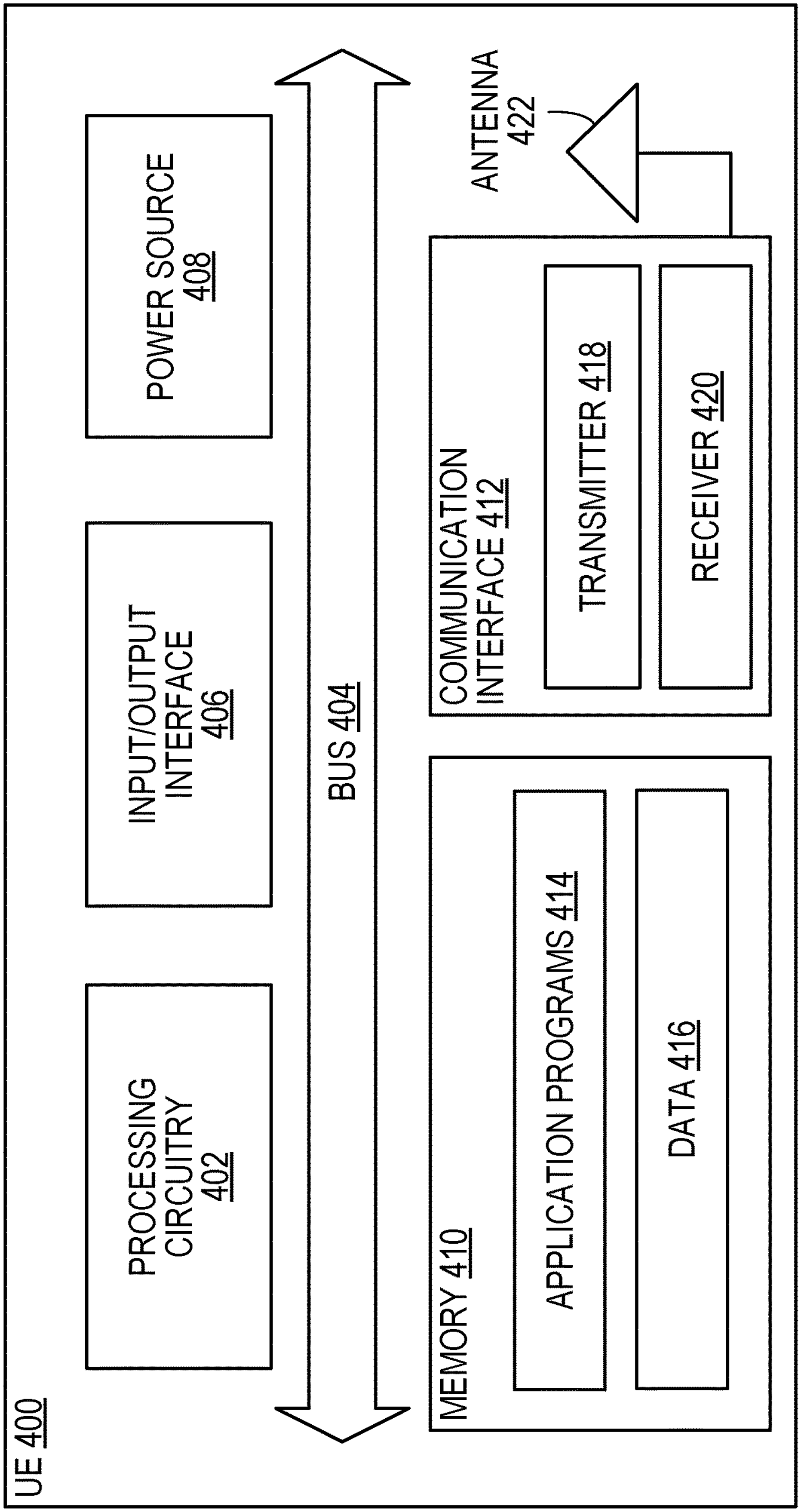
FIG. 4 shows an example of a user equipment according to embodiments of the disclosure.

FIG. 4 shows a UE 400 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 400 includes processing circuitry 402 that is operatively coupled via a bus 404 to an input/output interface 406, a power source 408, a memory 410, a communication interface 412, and/or any other component, or any combination thereof. Certain UEs may utilize all or a subset of the components shown in FIG. 4. The level of integration between the components may vary from one UE to another UE. Further, certain UEs may contain multiple instances of a component, such as multiple processors, memories, transceivers, transmitters, receivers, etc.

The processing circuitry 402 is configured to process instructions and data and may be configured to implement any sequential state machine operative to execute instructions stored as machine-readable computer programs in the memory 410. The processing circuitry 402 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 402 may include multiple central processing units (CPUs). The processing circuitry 402 may be operable to provide, either alone or in conjunction with other UE 400 components, such as the memory 410, UE 400 functionality. For example, the processing circuitry 402 may be configured to cause the UE 402 to perform the methods as described with reference to FIG. 1.

In the example, the input/output interface 406 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 400. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 408 is structured as a battery or battery pack. Other types of power sources, such as an external power source (e.g., an electricity outlet), photovoltaic device, or power cell, may be used. The power source 408 may further include power circuitry for delivering power from the power source 408 itself, and/or an external power source, to the various parts of the UE 400 via input circuitry or an interface such as an electrical power cable. Delivering power may be, for example, for charging of the power source 408. Power circuitry may perform any formatting, converting, or other modification to the power from the power source 408 to make the power suitable for the respective components of the UE 400 to which power is supplied.

The memory 410 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 410 includes one or more application programs 414, such as an operating system, web browser application, a widget, gadget engine, or other application, and corresponding data 416. The memory 410 may store, for use by the UE 400, any of a variety of various operating systems or combinations of operating systems.

The memory 410 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 410 may allow the UE 400 to access instructions, application programs and the like, stored on transitory or non-transitory memory media, to off-load data, or to upload data. An article of manufacture, such as one utilizing a communication system may be tangibly embodied as or in the memory 410, which may be or comprise a device-readable storage medium.

The processing circuitry 402 may be configured to communicate with an access network or other network using the communication interface 412. The communication interface 412 may comprise one or more communication subsystems and may include or be communicatively coupled to an antenna 422. The communication interface 412 may include one or more transceivers used to communicate, such as by communicating with one or more remote transceivers of another device capable of wireless communication (e.g., another UE or a network node in an access network). Each transceiver may include a transmitter 418 and/or a receiver 420 appropriate to provide network communications (e.g., optical, electrical, frequency allocations, and so forth). Moreover, the transmitter 418 and receiver 420 may be coupled to one or more antennas (e.g., antenna 422) and may share circuit components, software or firmware, or alternatively be implemented separately.

In some embodiments, communication functions of the communication interface 412 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 412, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE 400 shown in FIG. 4.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 5:
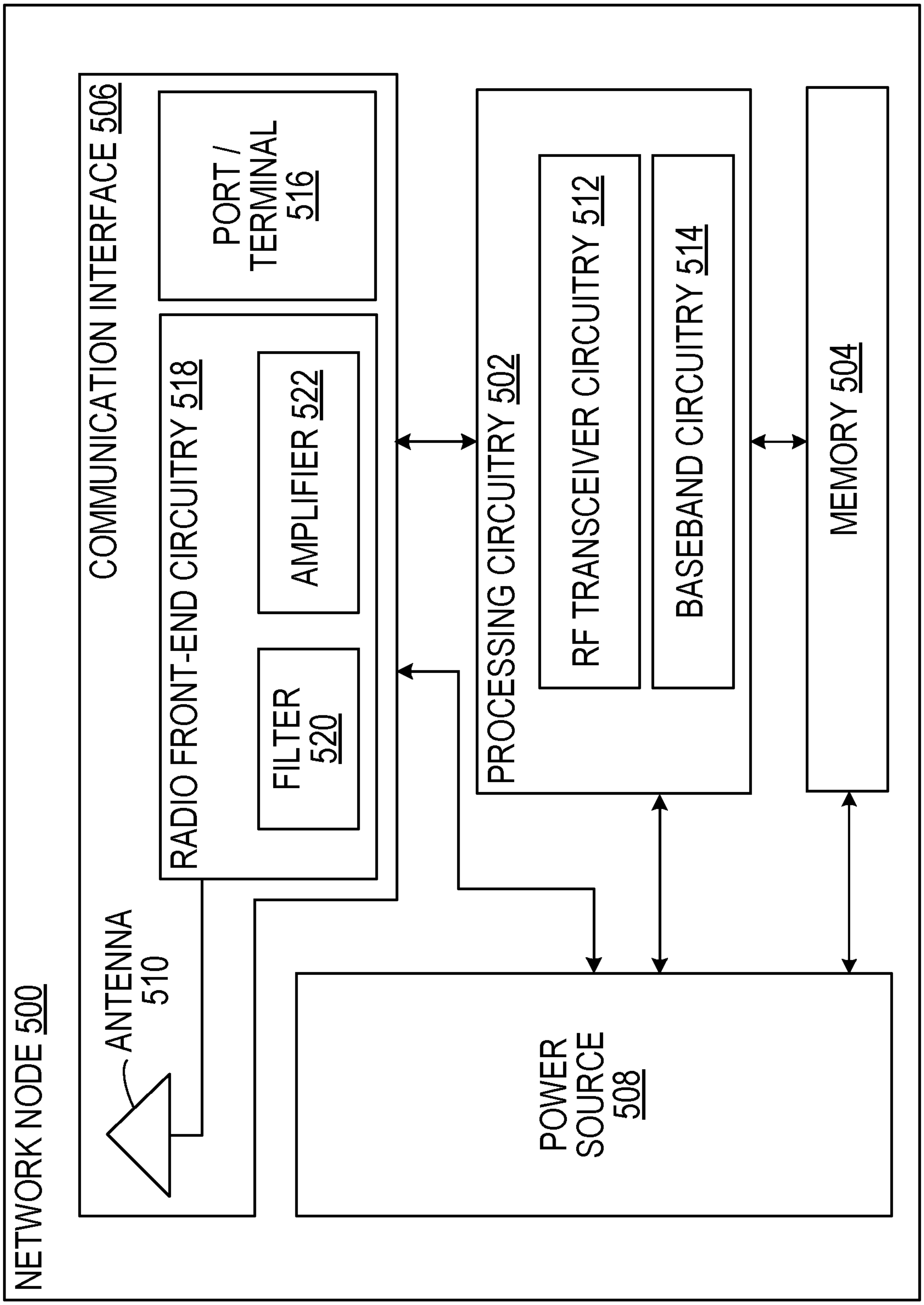
FIG. 5 shows an example of a network node according to embodiments of the disclosure.

FIG. 5 shows a network node 500 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 500 includes processing circuitry 502, a memory 504, a communication interface 506, and a power source 508, and/or any other component, or any combination thereof. The network node 500 may be composed of multiple physically separate components (e.g., a NodeB component and a RNC component, or a BTS component and a BSC component, etc.), which may each have their own respective components. In certain scenarios in which the network node 500 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 500 may be configured to support multiple radio access technologies (RATs). In such embodiments, some components may be duplicated (e.g., separate memory 504 for different RATs) and some components may be reused (e.g., a same antenna 510 may be shared by different RATs). The network node 500 may also include multiple sets of the various illustrated components for different wireless technologies integrated into network node 500, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 500.

The processing circuitry 502 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 500 components, such as the memory 504, network node 500 functionality. For example, the processing circuitry 502 may be configured to cause the network node to perform the methods as described with reference to FIG. 2.

In some embodiments, the processing circuitry 502 includes a system on a chip (SOC). In some embodiments, the processing circuitry 502 includes one or more of radio frequency (RF) transceiver circuitry 512 and baseband processing circuitry 514. In some embodiments, the radio frequency (RF) transceiver circuitry 512 and the baseband processing circuitry 514 may be on separate chips (or sets of chips), boards, or units, such as radio units and digital units. In alternative embodiments, part or all of RF transceiver circuitry 512 and baseband processing circuitry 514 may be on the same chip or set of chips, boards, or units.

The memory 504 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 502. The memory 504 may store any suitable instructions, data, or information, including a computer program, software, an application including one or more of logic, rules, code, tables, and/or other instructions capable of being executed by the processing circuitry 502 and utilized by the network node 500. The memory 504 may be used to store any calculations made by the processing circuitry 502 and/or any data received via the communication interface 506. In some embodiments, the processing circuitry 502 and memory 504 is integrated.

The communication interface 506 is used in wired or wireless communication of signaling and/or data between a network node, access network, and/or UE. As illustrated, the communication interface 506 comprises port(s)/terminal(s) 516 to send and receive data, for example to and from a network over a wired connection. The communication interface 506 also includes radio front-end circuitry 518 that may be coupled to, or in certain embodiments a part of, the antenna 510. Radio front-end circuitry 518 comprises filters 520 and amplifiers 522. The radio front-end circuitry 518 may be connected to an antenna 510 and processing circuitry 502. The radio front-end circuitry may be configured to condition signals communicated between antenna 510 and processing circuitry 502. The radio front-end circuitry 518 may receive digital data that is to be sent out to other network nodes or UEs via a wireless connection. The radio front-end circuitry 518 may convert the digital data into a radio signal having the appropriate channel and bandwidth parameters using a combination of filters 520 and/or amplifiers 522. The radio signal may then be transmitted via the antenna 510. Similarly, when receiving data, the antenna 510 may collect radio signals which are then converted into digital data by the radio front-end circuitry 518. The digital data may be passed to the processing circuitry 502. In other embodiments, the communication interface may comprise different components and/or different combinations of components.

In certain alternative embodiments, the network node 500 does not include separate radio front-end circuitry 518, instead, the processing circuitry 502 includes radio front-end circuitry and is connected to the antenna 510. Similarly, in some embodiments, all or some of the RF transceiver circuitry 512 is part of the communication interface 506. In still other embodiments, the communication interface 506 includes one or more ports or terminals 516, the radio front-end circuitry 518, and the RF transceiver circuitry 512, as part of a radio unit (not shown), and the communication interface 506 communicates with the baseband processing circuitry 514, which is part of a digital unit (not shown).

The antenna 510 may include one or more antennas, or antenna arrays, configured to send and/or receive wireless signals. The antenna 510 may be coupled to the radio front-end circuitry 518 and may be any type of antenna capable of transmitting and receiving data and/or signals wirelessly. In certain embodiments, the antenna 510 is separate from the network node 500 and connectable to the network node 500 through an interface or port.

The antenna 510, communication interface 506, and/or the processing circuitry 502 may be configured to perform any receiving operations and/or certain obtaining operations described herein as being performed by the network node. Any information, data and/or signals may be received from a UE, another network node and/or any other network equipment. Similarly, the antenna 510, the communication interface 506, and/or the processing circuitry 502 may be configured to perform any transmitting operations described herein as being performed by the network node. Any information, data and/or signals may be transmitted to a UE, another network node and/or any other network equipment.

The power source 508 provides power to the various components of network node 500 in a form suitable for the respective components (e.g., at a voltage and current level needed for each respective component). The power source 508 may further comprise, or be coupled to, power management circuitry to supply the components of the network node 500 with power for performing the functionality described herein. For example, the network node 500 may be connectable to an external power source (e.g., the power grid, an electricity outlet) via an input circuitry or interface such as an electrical cable, whereby the external power source supplies power to power circuitry of the power source 508. As a further example, the power source 508 may comprise a source of power in the form of a battery or battery pack which is connected to, or integrated in, power circuitry. The battery may provide backup power should the external power source fail.

Embodiments of the network node 500 may include additional components beyond those shown in FIG. 5 for providing certain aspects of the network node's functionality, including any of the functionality described herein and/or any functionality necessary to support the subject matter described herein. For example, the network node 500 may include user interface equipment to allow input of information into the network node 500 and to allow output of information from the network node 500. This may allow a user to perform diagnostic, maintenance, repair, and other administrative functions for the network node 500.

Figure 6:
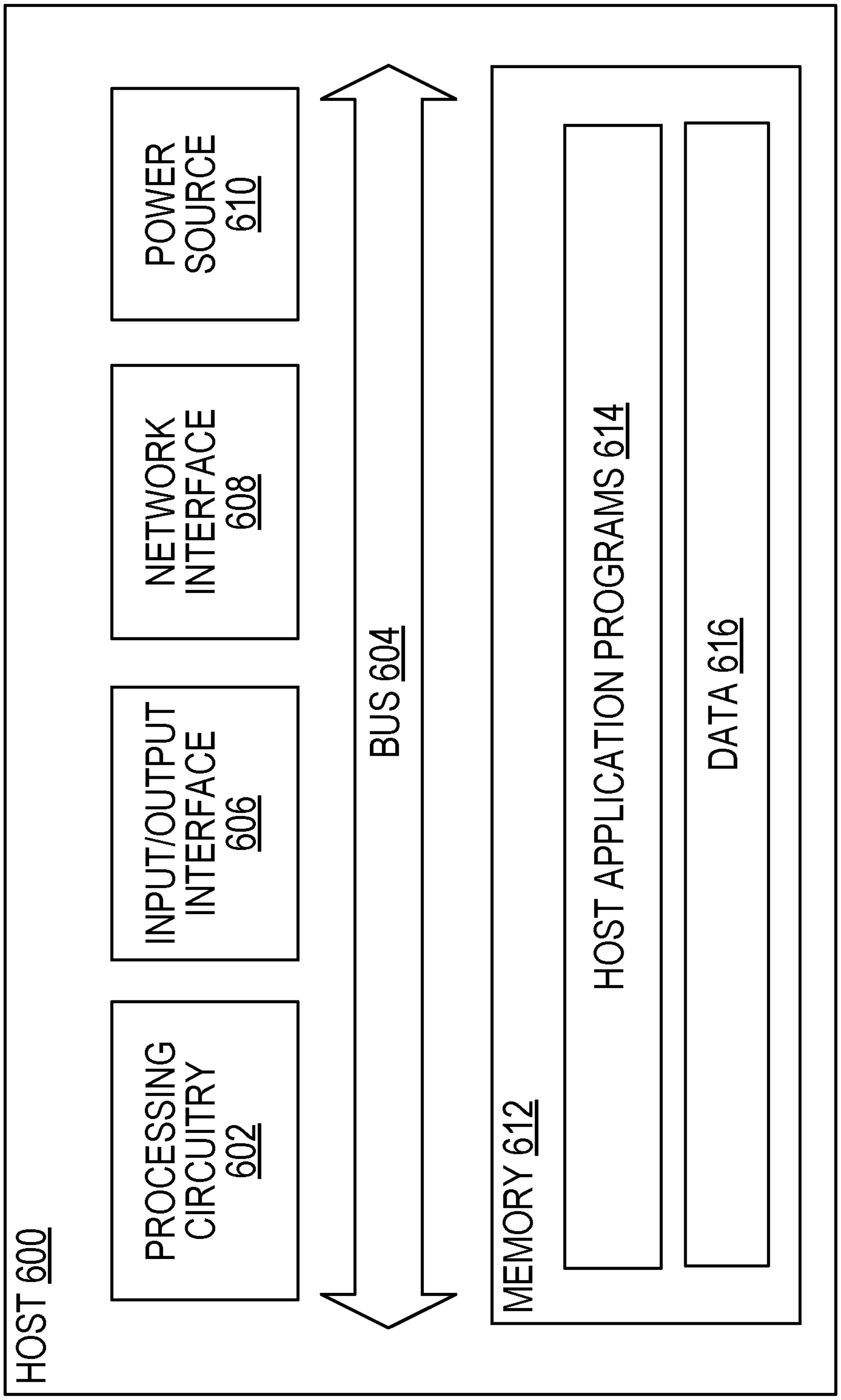
FIG. 6 is a block diagram of host according to embodiments of the disclosure.

FIG. 6 is a block diagram of a host 600, which may be an embodiment of the host 316 of FIG. 3, in accordance with various aspects described herein. As used herein, the host 600 may be or comprise various combinations hardware and/or software, including a standalone server, a blade server, a cloud-implemented server, a distributed server, a virtual machine, container, or processing resources in a server farm. The host 600 may provide one or more services to one or more UEs.

The host 600 includes processing circuitry 602 that is operatively coupled via a bus 604 to an input/output interface 606, a network interface 608, a power source 610, and a memory 612. Other components may be included in other embodiments. Features of these components may be substantially similar to those described with respect to the devices of previous figures, such as FIGS. 4 and 5, such that the descriptions thereof are generally applicable to the corresponding components of host 600.

The memory 612 may include one or more computer programs including one or more host application programs 614 and data 616, which may include user data, e.g., data generated by a UE for the host 600 or data generated by the host 600 for a UE. Embodiments of the host 600 may utilize only a subset or all of the components shown. The host application programs 614 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 614 may also provide for user authentication and licensing checks and may periodically report health, routes, and content availability to a central node, such as a device in or on the edge of a core network. Accordingly, the host 600 may select and/or indicate a different host for over-the-top services for a UE. The host application programs 614 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 7:
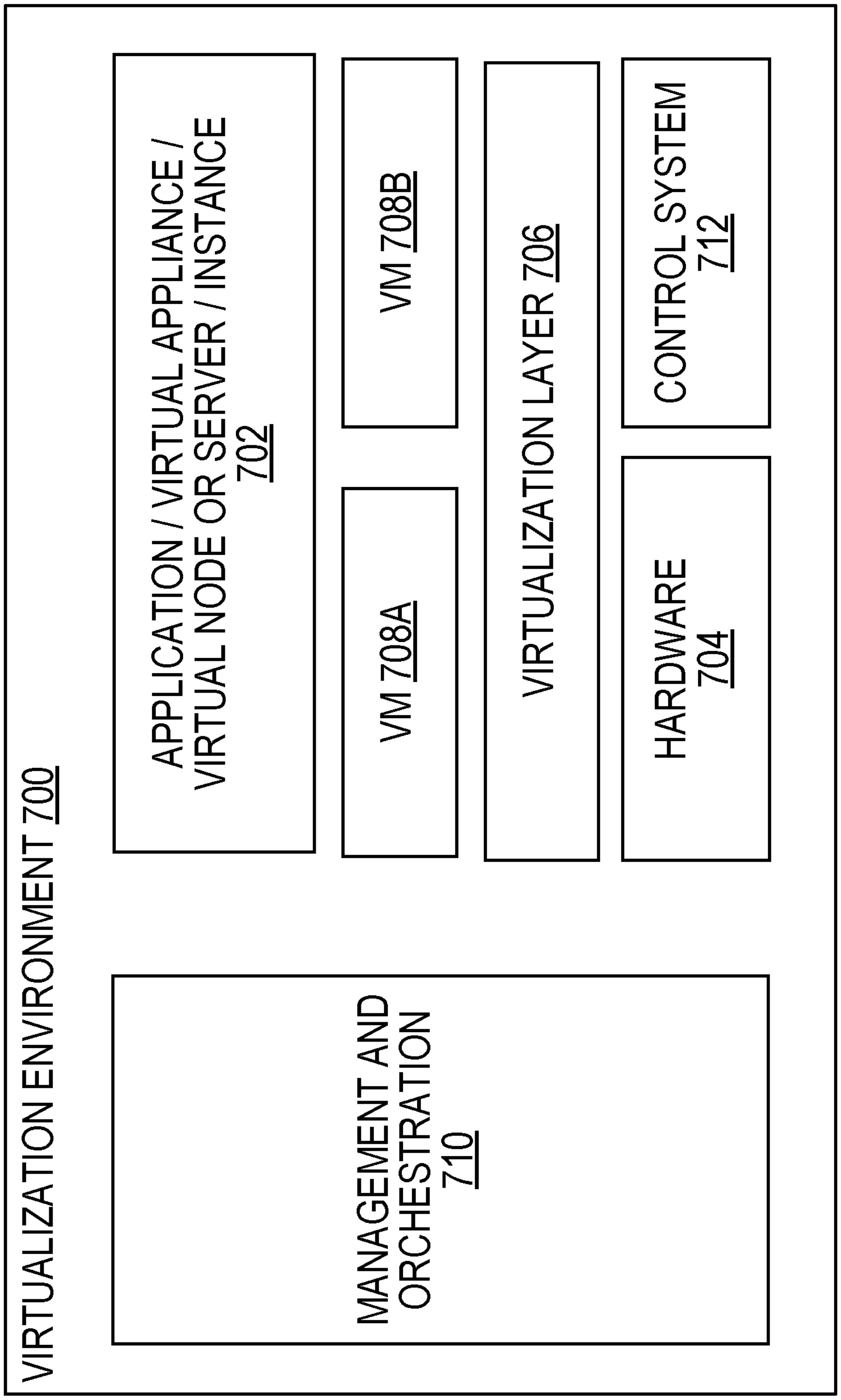
FIG. 7 is a block diagram illustrating a virtualization environment according to embodiments of the disclosure.

FIG. 7 is a block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 700 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 702 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 704 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 706 (also referred to as hypervisors or virtual machine monitors (VMMs)), provide VMs 708*a* and 708*b* (one or more of which may be generally referred to as VMs 708), and/or perform any of the functions, features and/or benefits described in relation with some embodiments described herein. The virtualization layer 706 may present a virtual operating platform that appears like networking hardware to the VMs 708.

The VMs 708 comprise virtual processing, virtual memory, virtual networking or interface and virtual storage, and may be run by a corresponding virtualization layer 706. Different embodiments of the instance of a virtual appliance 702 may be implemented on one or more of VMs 708, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 708 may be a software implementation of a physical machine that runs programs as if they were executing on a physical, non-virtualized machine. Each of the VMs 708, and that part of hardware 704 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 708 on top of the hardware 704 and corresponds to the application 702.

Hardware 704 may be implemented in a standalone network node with generic or specific components. Hardware 704 may implement some functions via virtualization. Alternatively, hardware 704 may be part of a larger cluster of hardware (e.g. such as in a data center or CPE) where many hardware nodes work together and are managed via management and orchestration 710, which, among others, oversees lifecycle management of applications 702. In some embodiments, hardware 704 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 712 which may alternatively be used for communication between hardware nodes and radio units.

Figure 8:
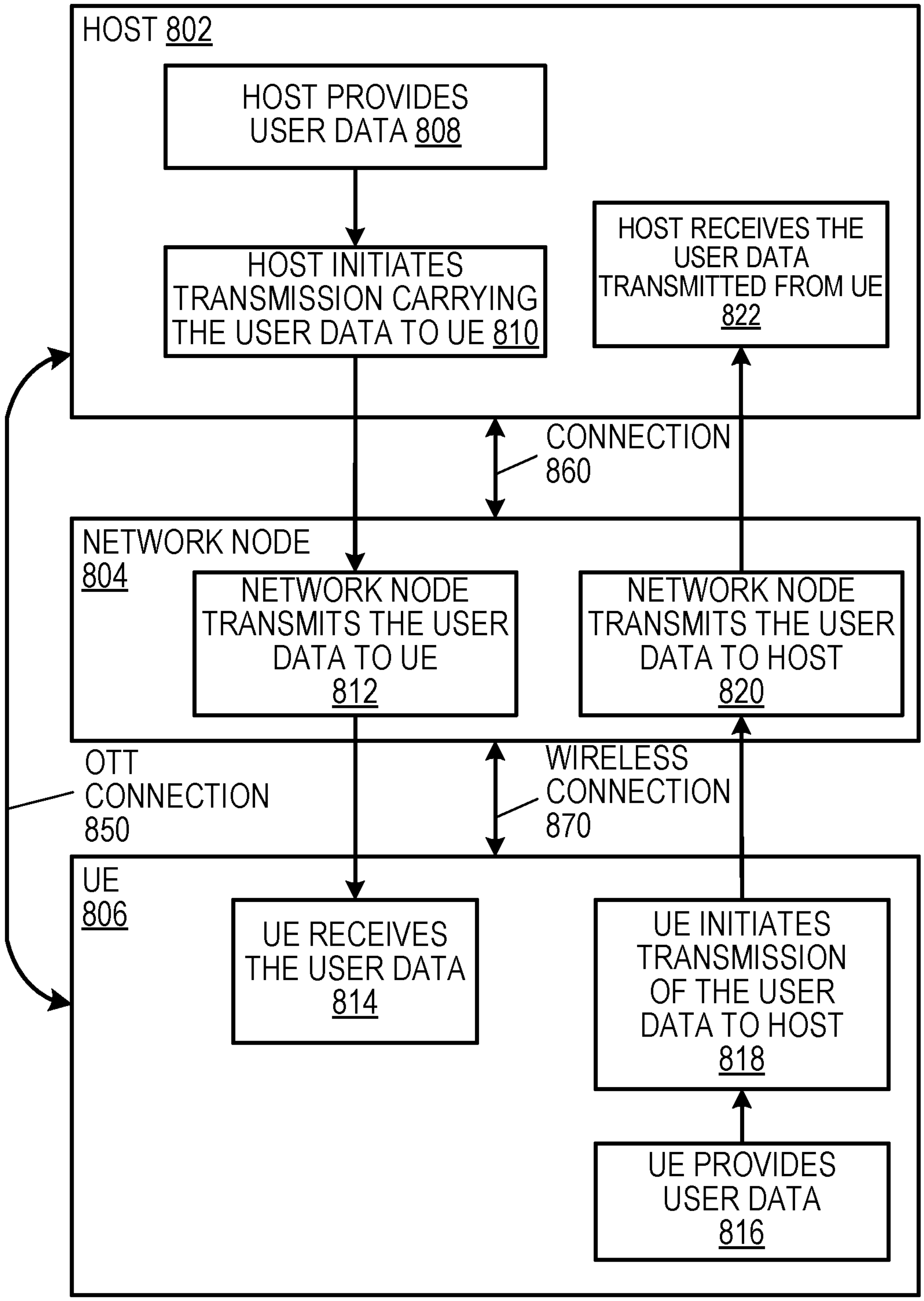
FIG. 8 is a communication diagram according to embodiments of the disclosure.

FIG. 8 shows a communication diagram of a host 802 communicating via a network node 804 with a UE 806 over a partially wireless connection in accordance with some embodiments. Example implementations, in accordance with various embodiments, of the UE (such as a UE 312*a* of FIG. 3 and/or UE 400 of FIG. 4), network node (such as network node 310*a* of FIG. 3 and/or network node 500 of FIG. 5), and host (such as host 316 of FIG. 3 and/or host 600 of FIG. 6) discussed in the preceding paragraphs will now be described with reference to FIG. 8.

Like host 600, embodiments of host 802 include hardware, such as a communication interface, processing circuitry, and memory. The host 802 also includes software, which is stored in or accessible by the host 802 and executable by the processing circuitry. The software includes a host application that may be operable to provide a service to a remote user, such as the UE 806 connecting via an over-the-top (OTT) connection 850 extending between the UE 806 and host 802. In providing the service to the remote user, a host application may provide user data which is transmitted using the OTT connection 850.

The network node 804 includes hardware enabling it to communicate with the host 802 and UE 806. The connection 860 may be direct or pass through a core network (like core network 306 of FIG. 3) and/or one or more other intermediate networks, such as one or more public, private, or hosted networks. For example, an intermediate network may be a backbone network or the Internet.

The UE 806 includes hardware and software, which is stored in or accessible by UE 806 and executable by the UE's processing circuitry. The software includes a client application, such as a web browser or operator-specific "app" that may be operable to provide a service to a human or non-human user via UE 806 with the support of the host 802. In the host 802, an executing host application may communicate with the executing client application via the OTT connection 850 terminating at the UE 806 and host 802. In providing the service to the user, the UE's client application may receive request data from the host's host application and provide user data in response to the request data. The OTT connection 850 may transfer both the request data and the user data. The UE's client application may interact with the user to generate the user data that it provides to the host application through the OTT connection 850.

The OTT connection 850 may extend via a connection 860 between the host 802 and the network node 804 and via a wireless connection 870 between the network node 804 and the UE 806 to provide the connection between the host 802 and the UE 806. The connection 860 and wireless connection 870, over which the OTT connection 850 may be provided, have been drawn abstractly to illustrate the communication between the host 802 and the UE 806 via the network node 804, without explicit reference to any intermediary devices and the precise routing of messages via these devices.

As an example of transmitting data via the OTT connection 850, in step 808, the host 802 provides user data, which may be performed by executing a host application. In some embodiments, the user data is associated with a particular human user interacting with the UE 806. In other embodiments, the user data is associated with a UE 806 that shares data with the host 802 without explicit human interaction. In step 810, the host 802 initiates a transmission carrying the user data towards the UE 806. The host 802 may initiate the transmission responsive to a request transmitted by the UE 806. The request may be caused by human interaction with the UE 806 or by operation of the client application executing on the UE 806. The transmission may pass via the network node 804, in accordance with the teachings of the embodiments described throughout this disclosure. Accordingly, in step 812, the network node 804 transmits to the UE 806 the user data that was carried in the transmission that the host 802 initiated, in accordance with the teachings of the embodiments described throughout this disclosure. In step 814, the UE 806 receives the user data carried in the transmission, which may be performed by a client application executed on the UE 806 associated with the host application executed by the host 802.

In some examples, the UE 806 executes a client application which provides user data to the host 802. The user data may be provided in reaction or response to the data received from the host 802. Accordingly, in step 816, the UE 806 may provide user data, which may be performed by executing the client application. In providing the user data, the client application may further consider user input received from the user via an input/output interface of the UE 806. Regardless of the specific manner in which the user data was provided, the UE 806 initiates, in step 818, transmission of the user data towards the host 802 via the network node 804. In step 820, in accordance with the teachings of the embodiments described throughout this disclosure, the network node 804 receives user data from the UE 806 and initiates transmission of the received user data towards the host 802. In step 822, the host 802 receives the user data carried in the transmission initiated by the UE 806.

One or more of the various embodiments improve the performance of OTT services provided to the UE 806 using the OTT connection 850, in which the wireless connection 870 forms the last segment. More precisely, the teachings of these embodiments may improve the performance of high priority actions (e.g., as defined above), while also permitting the reduction of power through relaxed measurements when appropriate and thereby provide benefits such as more robust positioning, better performance at cell reselection and extended battery lifetime.

In an example scenario, factory status information may be collected and analyzed by the host 802. As another example, the host 802 may process audio and video data which may have been retrieved from a UE for use in creating maps. As another example, the host 802 may collect and analyze real-time data to assist in controlling vehicle congestion (e.g., controlling traffic lights). As another example, the host 802 may store surveillance video uploaded by a UE. As another example, the host 802 may store or control access to media content such as video, audio, VR or AR which it can broadcast, multicast or unicast to UEs. As other examples, the host 802 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 850 between the host 802 and UE 806, in response to variations in the measurement results. The measurement procedure and/or the network functionality for reconfiguring the OTT connection may be implemented in software and hardware of the host 802 and/or UE 806. In some embodiments, sensors (not shown) may be deployed in or in association with other devices through which the OTT connection 850 passes; the sensors may participate in the measurement procedure by supplying values of the monitored quantities exemplified above, or supplying values of other physical quantities from which software may compute or estimate the monitored quantities. The reconfiguring of the OTT connection 850 may include message format, retransmission settings, preferred routing etc.; the reconfiguring need not directly alter the operation of the network node 804. Such procedures and functionalities may be known and practiced in the art. In certain embodiments, measurements may involve proprietary UE signaling that facilitates measurements of throughput, propagation times, latency and the like, by the host 802. The measurements may be implemented in that software causes messages to be transmitted, in particular empty or 'dummy' messages, using the OTT connection 850 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The following numbered statements set out embodiments of the disclosure:

Group A Embodiments

1. A method performed by a user equipment which is capable of operating in a relaxed measurement mode of operation, the method comprising:
   responsive to a determination that the user equipment is to perform or is performing one or more high-priority actions, refraining from operating in the relaxed measurement mode of operation.
2. The method of embodiment 1, wherein the user equipment is configured to enter the relaxed measurement mode of operation responsive to one or more criteria being fulfilled.
3. The method of embodiment 2, wherein at least one of the one or more criteria relate to mobility of the user equipment.
4. The method of embodiment 3, wherein the one or more criteria comprise a first criterion that mobility of the user equipment is low.
5. The method of any one of embodiments 2 to 4, wherein at least one of the one or more criteria relate to a location of the user equipment.
6. The method of embodiment 5, wherein the one or more criteria comprise a second criterion that the user equipment is located away from a cell edge.
7. The method of any one of embodiments 2 to 6, wherein at least one of the one or more criteria relate to radio measurements performed by the user equipment.
8. The method of embodiment 7, wherein the one or more criteria comprise a third criterion that a value of a radio measurement performed by the user equipment meets a threshold condition.
9. The method of embodiment 7 or 8, wherein the one or more criteria comprise a fourth criterion that a value of a radio measurement performed by the user equipment has not varied by more than a threshold amount.
10. The method of any one of embodiments 2 to 9, wherein the one or more criteria comprise a fifth criterion that the user equipment is configured with discontinuous reception.
11. The method of any one of embodiments 2 to 9, wherein the one or more criteria comprise a sixth criterion that the user equipment is configured with a discontinuous reception cycle that exceeds a threshold.
12. The method of any one of embodiments 2 to 11, wherein the one or more criteria comprise a seventh criterion that the user equipment is configured with a secondary cell, SCell, measurement cycle that exceeds a threshold.
13. The method of any one of embodiments 2 to 12, wherein refraining from operating in the relaxed measurement mode of operation comprises refraining from monitoring the one or more criteria.
14. The method of embodiment 13, wherein refraining from monitoring the one or more criteria comprises refraining from monitoring the one or more criteria until the one or more high-priority actions are stopped or completed.
15. The method of any one of embodiments 2 to 12, wherein refraining from operating in the relaxed measurement mode of operation comprises refraining from transmitting one or more reports to a network node indicating fulfilment of the one or more criteria.
16. The method of embodiment 15, wherein refraining from transmitting one or more reports comprises postponing transmission of the one or more reports until the one or more high-priority actions are stopped or completed.
17. The method of any one of embodiments 2 to 12, wherein refraining from operating in the relaxed measurement mode of operation comprises transmitting a report to a network node indicating fulfilment of the one or more criteria, wherein the report further comprises an indication that the user equipment is performing or is to perform one or more high-priority actions.
18. The method of embodiment 17, wherein the report further comprises an indication of an amount of time that performance of the one or more high-priority actions is expected to endure.
19. The method of any one of embodiments 2 to 12, further comprising delaying transmission of a report to a network node indicating fulfilment of the one or more criteria, such that the report is transmitted a time period after fulfillment of the one or more criteria.
20. The method of any one of embodiments 2 to 12, further comprising, responsive to a determination that the user equipment is performing or is to perform one or more high-priority actions, transmitting a report to a network node indicating non-fulfilment of the one or more criteria regardless of whether the one or more criteria are fulfilled or not.
21. The method of any one of the preceding embodiments, wherein refraining from operating in the relaxed measurement mode of operation comprises ignoring an instruction from a network node to enter the relaxed measurement mode of operation.
22. The method of any one of the preceding embodiments, wherein refraining from operating in the relaxed measurement mode of operation comprises refraining from operating in the relaxed measurement mode of operation until the one or more high-priority actions are stopped or completed.
23. The method of any one of the preceding embodiments, wherein, while operating in the relaxed measurement mode of operation, one or more of the following applies:
   the user equipment performs measurements less frequently than in a second measurement mode of operation different to the relaxed measurement mode of operation;
   the user equipment performs measurements over a longer period of time than in the second measurement mode of operation;
   the user equipment performs measurements only on non-serving cells over a longer period of time than in the second measurement mode of operation;

the user equipment performs measurements with an accuracy worse than in the second measurement mode of operation;

the user equipment performs measurements on fewer cells than in the second measurement mode of operation;

the user equipment performs measurements on fewer beams than in the second measurement mode of operation;

the user equipment performs measurements on fewer reference signals than in the second measurement mode of operation;

the user equipment refrains from performing measurements on cells of at least one non-serving carrier;

the user equipment performs measurements while meeting a requirement which is less stringent than a reference requirement;

the user equipment performs measurements only on a primary serving cell;

the user equipment refrains from performing measurements on non-serving cells; and the user equipment transmits measurement reports to a network node less frequently than the second measurement mode of operation.

24. The method of any one of the preceding embodiments, wherein the one or more high-priority actions comprise performance of one or more high-priority measurements.

25. The method of embodiment 24, wherein one or more of the following applies:

a high-priority measurement is a measurement performed by the user equipment for a critical purpose;

a high-priority measurement is a measurement performed by the user equipment only in a second measurement mode of operation different from the relaxed measurement mode of operation; and a high-priority measurement is a measurement performed by the user equipment while meeting a reference requirement.

26. The method of embodiment 25, wherein a critical purpose comprises one or more of: positioning; beam failure detection; candidate beam detection; radio link monitoring; radio link failure; emergency services; early measurement reporting; cell selection; cell change; self-organizing network configuration; automatic neighbour relations; time and/or frequency tracking or synchronization; measurement for active Transmission Configuration Indicator switching and cell global identifier acquisition.

27. The method of embodiment 26, wherein early measurement reporting comprises any one or more of: measurement in idle mode for carrier aggregation; measurement in inactive mode for carrier aggregation; measurement in idle mode for dual connectivity and measurement in inactive mode for dual connectivity.

28. The method of embodiment 26, wherein cell change comprises any one or more of: cell reselection; handover; serving cell change, handover with PSCell change RRC release with direction and RRC connection re-establishment.

29. The method of any one of embodiments 25 to 28, wherein the reference requirement for a measurement is more stringent than a reference requirement for the measurement performed in the relaxed measurement mode of operation.

30. The method of any one of the preceding embodiments, wherein the one or more high-priority actions are predefined, or wherein the one or more high-priority actions are configured by the network.

31. The method of any of the previous embodiments, further comprising:

providing user data; and forwarding the user data to a host via the transmission to the network node.

Group B Embodiments

32. A method performed by a network node, the method comprising:

receiving a report from a user equipment indicating fulfilment of one or more criteria for the user equipment to enter a relaxed measurement mode of operation, wherein the report further comprises an indication that the user equipment is performing or is to perform one or more high-priority actions; and refraining from immediately instructing the user equipment to enter the relaxed measurement mode of operation.

33. The method of embodiment 32, wherein the report further comprises an indication of an amount of time that performance of the one or more high-priority actions is expected to endure.

34. The method of embodiment 33, further comprising instructing the user equipment to enter the relaxed measurement mode of operation once the amount of time has passed.

35. The method of embodiment 34, wherein instructing the user equipment to enter the relaxed measurement mode of operation once the amount of time has passed comprises transmitting an instruction message to the user equipment once the amount of time has passed, the instruction message comprising an instruction to enter the relaxed measurement mode of operation.

36. The method of embodiment 34, wherein instructing the user equipment to enter the relaxed measurement mode of operation once the amount of time has passed comprises transmitting an instruction message to the user equipment, the instruction message comprising an instruction to enter the relaxed measurement mode of operation once the amount of time has passed.

37. The method of embodiments 32 to 36, wherein, while the user equipment is operating in the relaxed measurement mode of operation, one or more of the following applies:

the user equipment performs measurements less frequently than in a second measurement mode of operation different to the relaxed measurement mode of operation;

the user equipment performs measurements over a longer period of time than in the second measurement mode of operation;

the user equipment performs measurements only on non-serving cells over a longer period of time than in the second measurement mode of operation;

the user equipment performs measurements with an accuracy worse than in the second measurement mode of operation;

the user equipment performs measurements on fewer cells than in the second measurement mode of operation;

the user equipment performs measurements on fewer beams than in the second measurement mode of operation;

the user equipment performs measurements on fewer reference signals than in the second measurement mode of operation;

the user equipment refrains from performing measurements on cells of at least one non-serving carrier;

the user equipment performs measurements while meeting a requirement which is less stringent than a reference requirement;

the user equipment performs measurements only on a primary serving cell;

the user equipment refrains from performing measurements on non-serving cells; and the user equipment transmits measurement reports to a network node less frequently than the second measurement mode of operation.

38. The method of any one of embodiments 32 to 37, further comprising transmitting a configuration message to the user equipment, configuring the user equipment with one or more criteria upon fulfillment of which, the user equipment is to enter the relaxed measurement mode of operation.

39. The method of any of the previous embodiments, further comprising:

obtaining user data; and forwarding the user data to a host or a user equipment.

Group C Embodiments

40. A user equipment, comprising:

processing circuitry configured to cause the user equipment to perform any of the steps of any of the Group A embodiments; and power supply circuitry configured to supply power to the processing circuitry.

41. A network node, the network node comprising:

processing circuitry configured to cause the network node to perform any of the steps of any of the Group B embodiments;

power supply circuitry configured to supply power to the processing circuitry.

42. A user equipment (UE), the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

43. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

44. The host of the previous embodiment, wherein the cellular network further includes a network node configured to communicate with the UE to transmit the user data to the UE from the host.

45. The host of the previous 2 embodiments, wherein:

the processing circuitry of the host is configured to execute a host application, thereby providing the user data; and the host application is configured to interact with a client application executing on the UE, the client application being associated with the host application.

46. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of any of the Group A embodiments to receive the user data from the host.

47. The method of the previous embodiment, further comprising:

at the host, executing a host application associated with a client application executing on the UE to receive the user data from the UE.

48. The method of the previous embodiment, further comprising:

at the host, transmitting input data to the client application executing on the UE, the input data being provided by executing the host application, wherein the user data is provided by the client application in response to the input data from the host application.

49. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

50. The host of the previous embodiment, wherein the cellular network further includes a network node configured to communicate with the UE to transmit the user data from the UE to the host.

51. The host of the previous 2 embodiments, wherein:

the processing circuitry of the host is configured to execute a host application, thereby providing the user data; and the host application is configured to interact with a client application executing on the UE, the client application being associated with the host application.

52. A method implemented by a host configured to operate in a communication system that further includes a network node and a user equipment (UE), the method comprising:
at the host, receiving user data transmitted to the host via the network node by the UE, wherein the UE performs any of the steps of any of the Group A embodiments to transmit the user data to the host.
53. The method of the previous embodiment, further comprising:
at the host, executing a host application associated with a client application executing on the UE to receive the user data from the UE.
54. The method of the previous embodiment, further comprising:
at the host, transmitting input data to the client application executing on the UE, the input data being provided by executing the host application,
wherein the user data is provided by the client application in response to the input data from the host application.
55. A host configured to operate in a communication system to provide an over-the-top (OTT) service, the host comprising:
processing circuitry configured to provide user data; and
a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.
56. The host of the previous embodiment, wherein:
the processing circuitry of the host is configured to execute a host application that provides the user data; and
the UE comprises processing circuitry configured to execute a client application associated with the host application to receive the transmission of user data from the host.
57. A method implemented in a host configured to operate in a communication system that further includes a network node and a user equipment (UE), the method comprising:
providing user data for the UE; and
initiating a transmission carrying the user data to the UE via a cellular network comprising the network node, wherein the network node performs any of the operations of any of the Group B embodiments to transmit the user data from the host to the UE.
58. The method of the previous embodiment, further comprising, at the network node, transmitting the user data provided by the host for the UE.
59. The method of any of the previous 2 embodiments, wherein the user data is provided at the host by executing a host application that interacts with a client application executing on the UE, the client application being associated with the host application.
60. A communication system configured to provide an over-the-top service, the communication system comprising:
a host comprising:
processing circuitry configured to provide user data for a user equipment (UE), the user data being associated with the over-the-top service; and
a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.
61. The communication system of the previous embodiment, further comprising:
the network node; and/or
the user equipment.
62. A host configured to operate in a communication system to provide an over-the-top (OTT) service, the host comprising:
processing circuitry configured to initiate receipt of user data; and
a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.
63. The host of the previous 2 embodiments, wherein:
the processing circuitry of the host is configured to execute a host application, thereby providing the user data; and
the host application is configured to interact with a client application executing on the UE, the client application being associated with the host application.
64. The host of the any of the previous 2 embodiments, wherein the initiating receipt of the user data comprises requesting the user data.
65. A method implemented by a host configured to operate in a communication system that further includes a network node and a user equipment (UE), the method comprising:
at the host, initiating receipt of user data from the UE, the user data originating from a transmission which the network node has received from the UE, wherein the network node performs any of the steps of any of the Group B embodiments to receive the user data from the UE for the host.
66. The method of the previous embodiment, further comprising at the network node, transmitting the received user data to the host.

The invention claimed is:

1. A method performed by a user equipment which is capable of operating in a relaxed measurement mode of operation, the method comprising:
responsive to a determination that the user equipment is to perform or is performing one or more high-priority actions, refraining from operating in the relaxed measurement mode of operation despite criteria for operating in the relaxed measurement mode of operation being fulfilled, wherein the one or more high-priority actions are separate from the criteria for operating in the relaxed measurement mode of operation.

2. The method of claim 1, wherein refraining from operating in the relaxed measurement mode of operation comprises postponing reporting, to a network node, of a result of monitoring or evaluating the criteria for operating in the relaxed measurement mode of operation until after completion of the one or more high-priority actions, such that the network node is not informed of the fulfillment of the criteria for operating in the relaxed measurement mode until after completion of the one or more high-priority actions.

3. The method of claim 2, wherein one or more of the following applies:

a high-priority measurement is a measurement performed by the user equipment for a critical purpose;

a high-priority measurement is a measurement performed by the user equipment only in a second measurement mode of operation different from the relaxed measurement mode of operation; and a high-priority measurement is a measurement performed by the user equipment while meeting a reference requirement.

4. The method of claim 3, wherein a critical purpose comprises one or more of:

positioning; beam failure detection; candidate beam detection; radio link monitoring; radio link failure; emergency services; early measurement reporting; cell selection; self-organizing network configuration; automatic neighbour relations; time and/or frequency tracking or synchronization; measurement for active Transmission Configuration Indicator switching and cell global identifier acquisition.

5. The method of claim 3, wherein early measurement reporting comprises any one or more of: measurement in idle mode for carrier aggregation; measurement in inactive mode for carrier aggregation; measurement in idle mode for dual connectivity and measurement in inactive mode for dual connectivity.

6. The method of claim 3, wherein the reference requirement for a measurement is more stringent than a reference requirement for the measurement performed in the relaxed measurement mode of operation.

7. The method of claim 1, wherein the one or more high-priority actions comprise a measurement performed by the user equipment for cell change.

8. The method of claim 7, wherein cell change comprises one or more of: cell reselection; handover; serving cell change, handover with PSCell change RRC release with direction and RRC connection re-establishment.

9. The method of claim 1, wherein refraining from operating in the relaxed measurement mode of operation comprises ignoring an instruction from a network node to enter the relaxed measurement mode of operation.

10. The method of claim 1, wherein refraining from operating in the relaxed measurement mode of operation comprises refraining from operating in the relaxed measurement mode of operation until the one or more high-priority actions are stopped or completed.

11. The method of claim 1, wherein, while operating in the relaxed measurement mode of operation, one or more of the following applies:

the user equipment performs measurements less frequently than in a second measurement mode of operation different to the relaxed measurement mode of operation;

the user equipment performs measurements over a longer period of time than in the second measurement mode of operation;

the user equipment performs measurements only on non-serving cells over a longer period of time than in the second measurement mode of operation;

the user equipment performs measurements with an accuracy worse than in the second measurement mode of operation;

the user equipment performs measurements on fewer cells than in the second measurement mode of operation;

the user equipment performs measurements on fewer beams than in the second measurement mode of operation;

the user equipment performs measurements on fewer reference signals than in the second measurement mode of operation;

the user equipment refrains from performing measurements on cells of at least one non-serving carrier;

the user equipment performs measurements while meeting a requirement which is less stringent than a reference requirement;

the user equipment performs measurements only on a primary serving cell;

the user equipment refrains from performing measurements on non-serving cells; and the user equipment transmits measurement reports to a network node less frequently than the second measurement mode of operation.

12. The method of claim 1, wherein the user equipment is configured to enter the relaxed measurement mode of operation responsive to one or more criteria being fulfilled, wherein refraining from operating in the relaxed measurement mode of operation comprises transmitting a report to a network node indicating fulfilment of the one or more criteria, and wherein the report further comprises an indication that the user equipment is performing or is to perform one or more high-priority actions.

13. A method performed by a network node, the method comprising:

receiving a report from a user equipment indicating fulfilment of one or more criteria for the user equipment to enter a relaxed measurement mode of operation, and wherein the report further comprises an indication that the user equipment is performing or is to perform one or more high-priority actions that are separate from the criteria for operating in the relaxed measurement mode of operation; and responsive to the indication that the user equipment is performing or is to perform the one or more high-priority actions, refraining from immediately instructing the user equipment to enter the relaxed measurement mode of operation.

14. The method of claim 13, wherein the report further comprises an indication of an amount of time that performance of the one or more high-priority actions is expected to endure.

15. The method of claim 14, further comprising instructing the user equipment to enter the relaxed measurement mode of operation once the amount of time has passed.

16. The method of claim 15, wherein instructing the user equipment to enter the relaxed measurement mode of operation once the amount of time has passed comprises transmitting an instruction message to the user equipment once the amount of time has passed, the instruction message comprising an instruction to enter the relaxed measurement mode of operation.

17. The method of claim 15, wherein instructing the user equipment to enter the relaxed measurement mode of operation once the amount of time has passed comprises transmitting an instruction message to the user equipment, the instruction message comprising an instruction to enter the relaxed measurement mode of operation once the amount of time has passed.

18. The method of claim 13, wherein, while the user equipment is operating in the relaxed measurement mode of operation, one or more of the following applies:

the user equipment performs measurements less frequently than in a second measurement mode of operation different to the relaxed measurement mode of operation;

the user equipment performs measurements over a longer period of time than in the second measurement mode of operation;

the user equipment performs measurements only on non-serving cells over a longer period of time than in the second measurement mode of operation;

the user equipment performs measurements with an accuracy worse than in the second measurement mode of operation;

the user equipment performs measurements on fewer cells than in the second measurement mode of operation;

the user equipment performs measurements on fewer beams than in the second measurement mode of operation;

the user equipment performs measurements on fewer reference signals than in the second measurement mode of operation;

the user equipment refrains from performing measurements on cells of at least one non-serving carrier;

the user equipment performs measurements while meeting a requirement which is less stringent than a reference requirement;

the user equipment performs measurements only on a primary serving cell;

the user equipment refrains from performing measurements on non-serving cells; and the user equipment transmits measurement reports to a network node less frequently than the second measurement mode of operation.

19. A user equipment which selectively operates in a relaxed measurement mode of operation, the user equipment comprising:

processing circuitry configured to cause the user equipment to refrain from operating in the relaxed measurement mode of operation despite criteria for operating in the relaxed measurement mode of operation being fulfilled, responsive to a determination that the user equipment is to perform or is performing one or more high-priority actions;

wherein the one or more high-priority actions are separate from the criteria for operating in the relaxed measurement mode of operation.

20. A network node, the network node comprising:

processing circuitry configured to cause the network node to:

receive a report from a user equipment indicating fulfilment of criteria for the user equipment to enter a relaxed measurement mode of operation, and wherein the report further comprises an indication that the user equipment is performing or is to perform one or more high-priority actions that are separate from the criteria for operating in the relaxed measurement mode of operation; and responsive to the indication that the user equipment is performing or is to perform the one or more high-priority actions, refrain from immediately instructing the user equipment to enter the relaxed measurement mode of operation.

* * * * *